(12) United States Patent
Yu et al.

(10) Patent No.: US 12,657,006 B2
(45) Date of Patent: Jun. 16, 2026

(54) PROCESSING COMPONENT THAT INCLUDES AN ARITHMETIC AND LOGIC UNIT (ALU), DATA PROCESSING METHOD APPLIED TO THE PROCESSING COMPONENT, AND RELATED DEVICE

(71) Applicant: TENCENT TECHNOLOGY (SHENZHEN) COMPANY LIMITED, Shenzhen (CN)

(72) Inventors: Xiaoyu Yu, Shenzhen (CN); Dewei Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1186 days.

(21) Appl. No.: 17/579,489

(22) Filed: Jan. 19, 2022

(65) Prior Publication Data

US 2022/0137927 A1 May 5, 2022

Related U.S. Application Data

(63) Continuation of application No. PCT/CN2020/120164, filed on Oct. 10, 2020.

(30) Foreign Application Priority Data

Jan. 13, 2020 (CN) .......................... 202010035196.3

(51) Int. Cl.
G06F 7/57 (2006.01)
G06F 7/544 (2006.01)
G06F 17/16 (2006.01)

(52) U.S. Cl.
CPC .............. G06F 7/57 (2013.01); G06F 7/5443 (2013.01); G06F 17/16 (2013.01)

(58) Field of Classification Search
CPC ......... G06F 7/57; G06F 7/75443; G06F 17/16
See application file for complete search history.

(56) References Cited

U.S. PATENT DOCUMENTS 6,675,187 B1 * 1/2004 Greenberger ......... G06F 7/4806
708/622
2005/0223193 A1 10/2005 Knowles
(Continued)

FOREIGN PATENT DOCUMENTS

CN 101957743 A 1/2011
CN 102184089 A 9/2011
(Continued)

OTHER PUBLICATIONS

The World Intellectual Property Organization (WIPO) International Search Report for PCT/CN2020/120164 Jan. 13, 2021 5 Pages (including translation).

(Continued)

*Primary Examiner* — Michael D. Yaary
(74) *Attorney, Agent, or Firm* — Anova Law Group, PLLC

(57) ABSTRACT

A processing component includes at least one arithmetic and logic unit (ALU), the ALU including a decoding and parameter input channel, a data input channel, an operation component, a first port crossbar switch matrix, and a second port crossbar switch matrix, the decoding and parameter input channel being configured to receive an execution parameter; the data input channel being configured to receive first data and second data; the first port crossbar switch matrix being configured to input the first data to the operation component; the second port crossbar switch matrix being configured to input the second data to the operation component; and the operation component being configured to process the first
(Continued)

data and the second data according to the execution parameter to obtain a target operation result.

19 Claims, 11 Drawing Sheets

(56)                References Cited

U.S. PATENT DOCUMENTS

| 2020/0042868 | A1 |     | 2/2020  | Shao et al. |            |
|--------------|----|-----|---------|-------------|------------|
| 2020/0310804 | A1 | *   | 10/2020 | Hughes      | G06F 9/3877 |
| 2021/0150685 | A1 |     | 5/2021  | Chen et al. |            |

FOREIGN PATENT DOCUMENTS

| CN | 103218344 | A | 7/2013  |
|----|-----------|---|---------|
| CN | 107729990 | A | 2/2018  |
| CN | 107992329 | A | 5/2018  |
| CN | 109086075 | A | 12/2018 |
| CN | 109117184 | A | 1/2019  |
| CN | 109117949 | A | 1/2019  |
| CN | 109343826 | A | 2/2019  |
| CN | 109739556 | A | 5/2019  |
| CN | 111242293 | A | 6/2020  |

OTHER PUBLICATIONS

The World Intellectual Property Organization (WIPO) International Search Report for PCT/CN2020/120164 Jan. 13, 2021 6 Pages (including translation).

* cited by examiner (A)

(B)

(C)

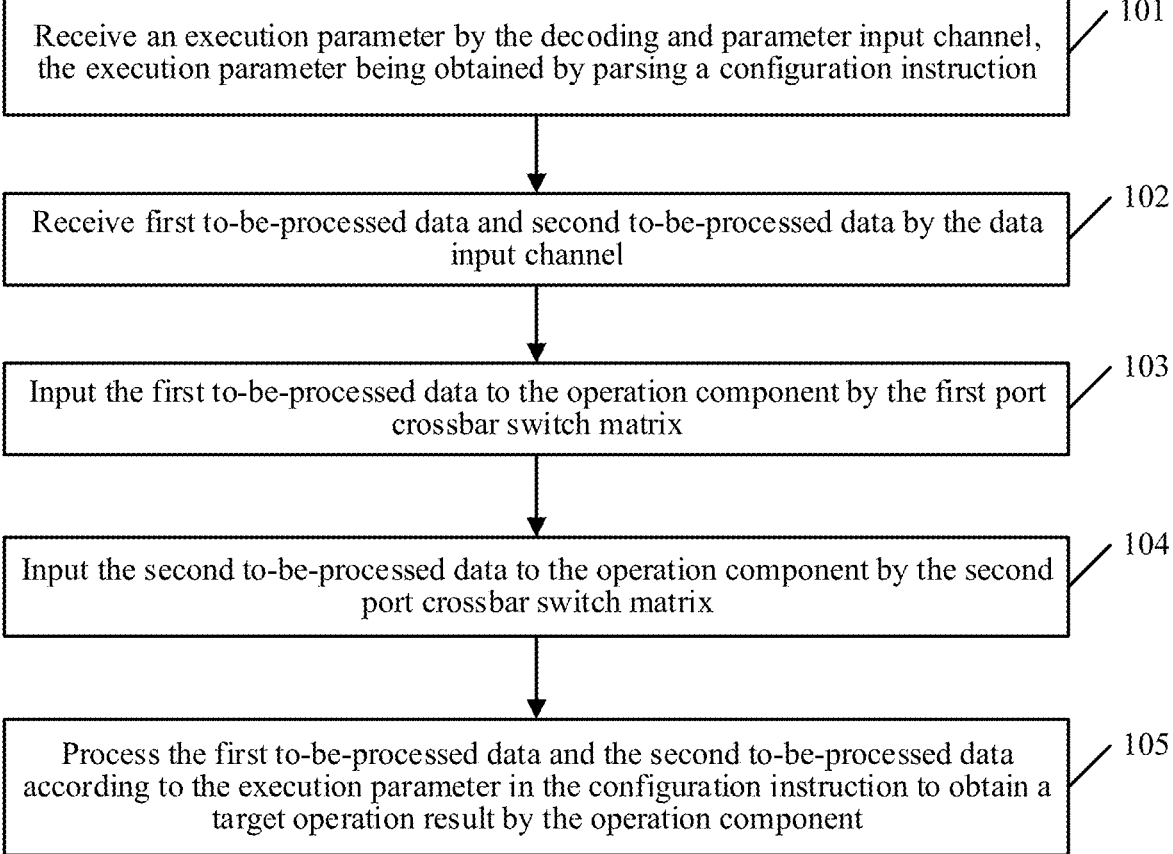

Receive an execution parameter by the decoding and parameter input channel, the execution parameter being obtained by parsing a configuration instruction — 101

Receive first to-be-processed data and second to-be-processed data by the data input channel — 102

Input the first to-be-processed data to the operation component by the first port crossbar switch matrix — 103

Input the second to-be-processed data to the operation component by the second port crossbar switch matrix — 104

Process the first to-be-processed data and the second to-be-processed data according to the execution parameter in the configuration instruction to obtain a target operation result by the operation component — 105

FIG. 11

PROCESSING COMPONENT THAT INCLUDES AN ARITHMETIC AND LOGIC UNIT (ALU), DATA PROCESSING METHOD APPLIED TO THE PROCESSING COMPONENT, AND RELATED DEVICE

RELATED APPLICATION

This application is a continuation application of PCT Patent Application No. PCT/CN2020/120164 filed on Oct. 10, 2020, which claims priority to Chinese Patent Application No. 202010035196.3, entitled "Processing component, data processing method, and related device" filed on Jan. 13, 2020, all of which are incorporated by reference in entirety.

FIELD OF THE TECHNOLOGY

The present disclosure relates to the field of chip technologies, and in particular, to a processing component and data processing.

BACKGROUND

With the development of semiconductor technologies, the computing power of hardware has been rapidly enhanced, and the time desirable for processing various big data has been gradually reduced. Based on this, artificial neural network technologies have also been further developed. Neural networks are usually large, which also means that these neural networks may require a lot of computing resources and storage resources. Therefore, higher requirements are imposed on the processing efficiency of deep learning processors.

At present, a multiplexing-based arithmetic and logic unit (ALU) design is usually adopted, that is, operations such as addition, multiplication, shifting, and comparison are set in the design, then a plurality of arithmetic units are placed in parallel, and the computing process is realized through input and output selectors.

SUMMARY

Embodiments of the present disclosure provide a processing component, a data processing method, and a related device, which allow for the configuration of an instruction configuration to implement continuous operations on continuous data inputs, thereby improving the operating efficiency of the processing component.

In one aspect, the present disclosure provides a processing component, the processing component including: at least one arithmetic and logic unit (ALU), the ALU including a decoding and parameter input channel, a data input channel, an operation component, a first port crossbar switch matrix, and a second port crossbar switch matrix, the decoding and parameter input channel being configured to receive an execution parameter, the execution parameter being obtained by parsing a configuration instruction; the data input channel being configured to receive first data and second data; the first port crossbar switch matrix being configured to input the first data to the operation component; the second port crossbar switch matrix being configured to input the second data to the operation component; and the operation component being configured to process the first data and the second data according to the execution parameter to obtain a target operation result.

In another aspect, the present disclosure provides a data processing method, applied to a processing component, the processing component including at least one arithmetic and logic unit (ALU), the ALU including a decoding and parameter input channel, a data input channel, an operation component, a first port crossbar switch matrix, and a second port crossbar switch matrix, the method including: receiving, by the decoding and parameter input channel, an execution parameter, the execution parameter being obtained by parsing a configuration instruction; receiving, by the data input channel, first data and second data; inputting the first data to the operation component by the first port crossbar switch matrix; inputting, by the second port crossbar switch matrix, the second data to the operation component; and processing, by the operation component, the first data and the second data according to the execution parameter in the configuration instruction to obtain a target operation result.

In yet another aspect, the present disclosure provides a non-transitory computer-readable storage medium storing computer program instructions executable by at least one processor to perform a method applied to a processing component, the processing component including at least one arithmetic and logic unit (ALU), the ALU including a decoding and parameter input channel, a data input channel, an operation component, a first port crossbar switch matrix, and a second port crossbar switch matrix, and the method including: receiving, by the decoding and parameter input channel, an execution parameter, the execution parameter being obtained by parsing a configuration instruction; receiving, by the data input channel, first data and second data; inputting, by the first port crossbar switch matrix, the first data to the operation component; inputting, by the second port crossbar switch matrix, the second data to the operation component; and processing, by the operation component, the first data and the second data according to the execution parameter to obtain a target operation result.

The first port crossbar switch matrix and the second port crossbar switch matrix control the input of data so that the data flows to the operation component. The operation component can process the data multiple times in one operation cycle based on the execution parameter, and finally output the operation result, thereby improving the operating efficiency of the processing component Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 11 is a schematic diagram of a data processing method according to embodiment(s) of the present disclosure.

DETAILED DESCRIPTION

Figure 1:
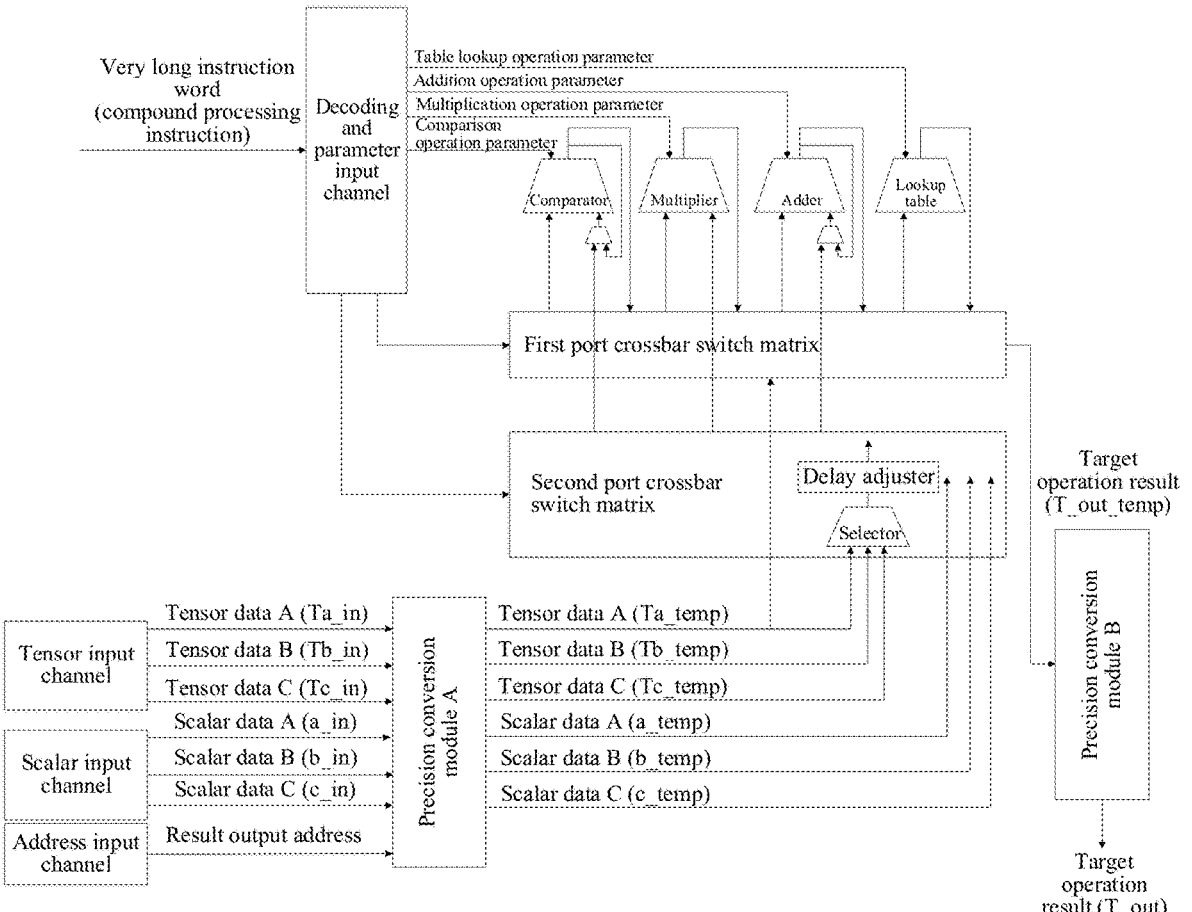
FIG. 1 is a schematic architecture diagram of a processing component according to embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Embodiments of the present disclosure provide a processing component, a data processing method, and an electronic device, which allow for the configuration of an instruction configuration to implement continuous operations on continuous data inputs, thereby improving the operating efficiency of the processing component.

The terms such as "first", "second", "third", and "fourth" (if any) in the present disclosure and claims of the present disclosure and in the accompanying drawings are used for distinguishing between similar objects and not necessarily used for describing any particular order or sequence. Data used in this way may be interchanged in an appropriate implementation, so that the embodiments of the present disclosure described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The processing component of the present disclosure can be applied to a deep learning processor, and its computing types include but are not limited to tensor calculation, vector calculation, and scalar calculation. Tensor operations include, but are not limited to, convolution operations and multi-batch inter-matrix operations. Vector operations can perform sliding window-based operations on each two-dimensional plane at each depth in a three-dimensional tensor. Vector operations are for the implementations where operations in the depth direction are not involved, and include, for example, pooling, upsampling, depthwise separable convolution, activation function, pointwise operation, etc., where the pointwise operation may be an add, subtract, multiplication, or division operation performed between corresponding position elements of two tensors with the same height, width and depth. Scalar operations can implement control operations, parameter operations, cycle number scheduling, etc. A multiplexing-based arithmetic and logic unit (ALU) design is usually adopted, that is, operations such as addition, multiplication, shifting, and comparison are set in the design, then a plurality of arithmetic units are placed in parallel, and the above operations are realized through input and output selectors.

To improve the operating efficiency of the deep learning processor, an embodiment of the present disclosure provides a processing component. Referring to FIG. 1, FIG. 1 is a schematic architecture diagram of a processing component according to an embodiment of the present disclosure. As shown in the figure, the processing component includes at least one arithmetic and logic unit (ALU). The ALU may include a decoding and parameter input channel, a data input channel, an operation component, and a first port crossbar switch matrix, a second port crossbar switch matrix, a precision conversion module, a selector, and a delay adjuster. The operation component may include but is not limited to a comparator, a multiplier, an adder, and a lookup table. The data input channel includes but is not limited to a tensor input channel, a scalar input channel, and an address input channel. The precision conversion module may include at least one precision conversion module.

The decoding and parameter input channel can receive a table lookup processing parameter, an addition processing parameter, a multiplication processing parameter, and a comparison processing parameter, and the above processing parameters can be decoded to obtain execution parameters set by the operation component. That is to say, the above processing instructions can carry operation parameters. The operation parameters are transferred to the corresponding operation components by the decoding and parameter input channel. For example, the comparator can receive a comparison operation parameter transmitted by the decoding and parameter input channel, the multiplier can receive a multiplication operation parameter transmitted by the decoding and parameter input channel, the adder can receive an addition operation parameter transmitted by the decoding and parameter input channel, and the lookup table can receive a table lookup operation parameter transmitted by the decoding and parameter input channel. The lookup table is configurable and can be configured before the operation, data in the table is fixed, and the table can be directly looked up based on a data value in subsequent operations.

The tensor input channel can receive tensor data A (Ta_in), tensor data B (Tb_in), and tensor data C (Tc_in). The scalar input channel can receive scalar data A (a_in), scalar data B (b_in), and scalar Data C (c_in). The data can be input to a precision conversion module A through the tensor input channel and the scalar input channel, and the precision conversion module A performs format conversion on the data. The precision conversion module A inputs the converted tensor data A (Ta_temp) into the first port crossbar switch matrix, and can also input the converted scalar data A (a_temp), scalar data B (b_temp) and scalar data C (c_temp) to the second port crossbar switch matrix, or input the converted tensor data A (Ta_temp), tensor data B (Tb_temp) and tensor data C (Tc_temp) into the delay adjuster in the second port crossbar switch matrix. The delay adjuster is connected to the selector. The selector can select to put through the tensor data A (Ta_temp), the tensor data B (Tb_temp) and the tensor data C (Tc_temp). The delay adjuster can input the data transmitted by the selector to the operation component in a clock cycle. There may be one or more delay adjusters, and the maximum number of delay adjusters may be the same as the number of channels for tensor inputting.

The first port crossbar switch matrix can input the scalar data A (a_temp) inputted by the precision conversion module A to any operation component selected from the comparator, the multiplier, the adder, and the lookup table. The second port crossbar switch matrix can input the tensor data A (Ta_temp), the tensor data B (Tb_temp), the tensor data C (Tc_temp), the scalar data A (a_temp), the scalar data B (b_temp), and the scalar data C (c_temp) to any operation component selected from the comparator, the multiplier, the adder, and the lookup table. In practical implementations, the scalar data A (a_temp), the scalar data B (b_temp), and the scalar data C (c_temp) may need to be copied through the second port crossbar switch matrix, to expand each scalar data into a vector with identical elements, and then the vector is input to any operation component selected from the comparator, the multiplier, the adder, and the lookup table.

The operation component can process the data transmitted by the first port crossbar switch matrix and the second port crossbar switch matrix according to at least two of the comparison operation parameter, the multiplication operation parameter, the addition operation parameter, and the table lookup operation parameter inputted through the decoding and parameter input channel, to obtain the target operation result (T_out), and then input the target operation result (T_out) to the first port crossbar switch matrix. The first port crossbar switch matrix then inputs the target operation result (T_out) to the precision conversion Module B. Then the precision conversion module B can convert the format of the target operation result (T_out), and output the converted target operation result (T_out). Thus, the data processing is performed. In addition, the comparator in the operation component can also process the data transmitted by the first port crossbar switch matrix and the second port crossbar switch matrix according to the comparison operation parameter to obtain an intermediate operation result, and then input the intermediate operation result to the first port crossbar switch matrix. The first port crossbar switch matrix inputs the intermediate operation result and the data transmitted by the second port crossbar switch matrix to the multiplier in the operation component. Then the multiplier can process the data according to the multiplication operation parameter to obtain the target operation result (T_out). Then the multiplier inputs the target operation result (T_out) to the first port crossbar switch matrix. The first port crossbar switch matrix then inputs the target operation result (T_out) to the precision conversion Module B. Then the precision conversion module B can convert the format of the target operation result (T_out), and output the converted target operation result (T_out). Thus, the data processing is performed.

Although FIG. 1 shows only one decoding and parameter input channel, one data input channel, four operation components, one first port crossbar switch matrix, one second port crossbar switch matrix, two precision conversion modules, one selector, and one delay adjuster, the example in FIG. 1 is only used for understanding the solution of the present disclosure, and in practical implementations, the number of components in the processing component may be flexibly determined depending on actual situations.

Figure 2:
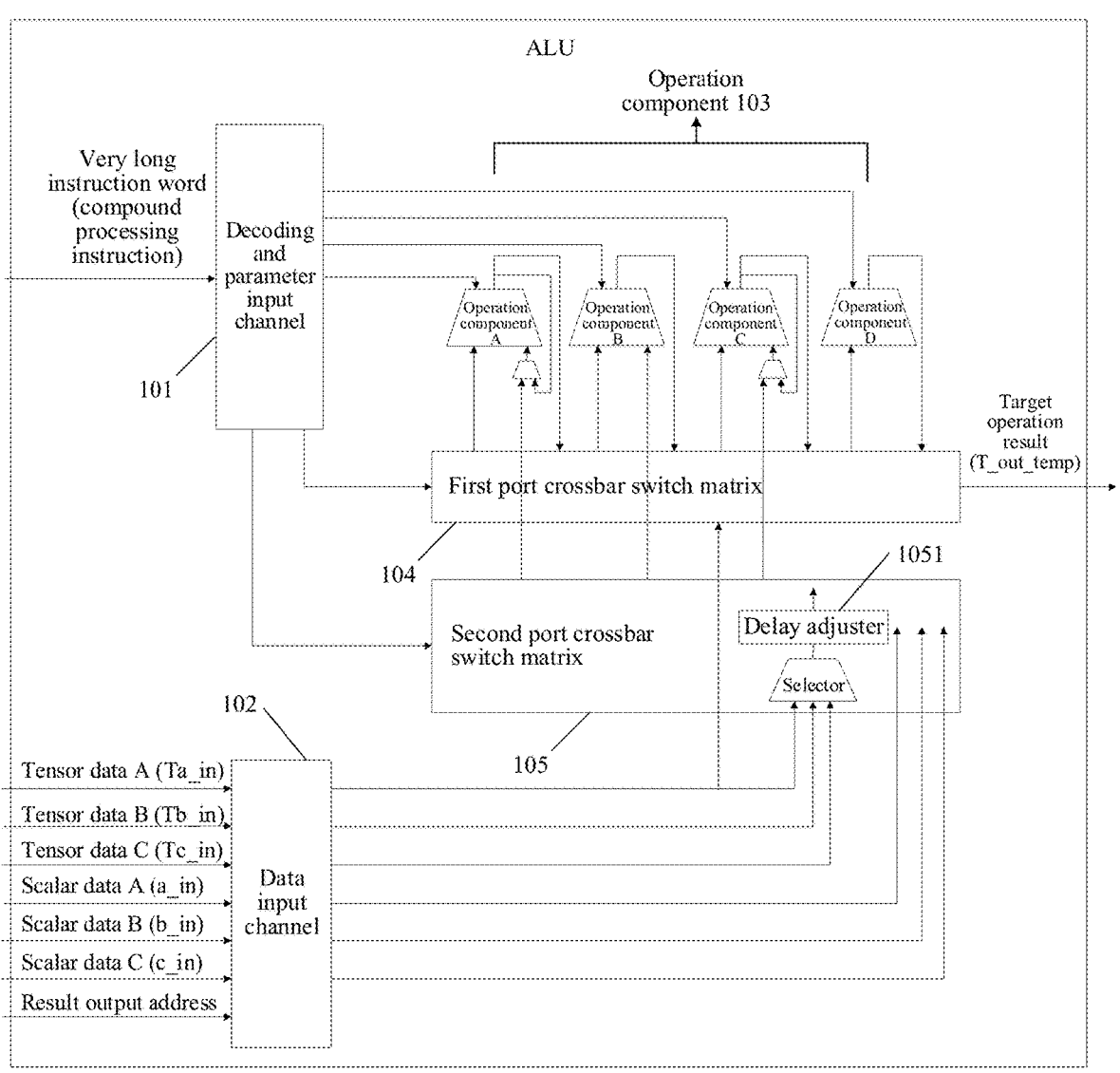
FIG. 2 is a schematic diagram of a processing component according to embodiment(s) of the present disclosure.

Based on the above description, the present disclosure proposes a processing component. The processing component in the present disclosure will be described in detail below. Referring to FIG. 2, FIG. 2 is a schematic diagram of an embodiment of the processing component according to the embodiments of the present disclosure. As shown in the figure, the processing component includes at least one ALU. The ALU may include: a decoding and parameter input channel 101, a data input channel 102, an operation component 103, a first port crossbar switch matrix 104, and a second port crossbar switch matrix 105.

The decoding and parameter input channel 101 is configured to receive an execution parameter, the execution parameter being obtained by parsing a configuration instruction.

The data input channel 102 is configured to receive first to-be-processed data and second to-be-processed data.

In certain embodiment(s) of the present disclosure, the term "to-be-processed data" may be referred to as "data." Accordingly, the term "first to-be-processed data" may be interchangeably referred to as "first data," the term "second to-be-processed data" may be interchangeably referred to as "second data," and the term "third to-be-processed data" may be interchangeably referred to as "third data."

The first port crossbar switch matrix 104 is configured to input the first to-be-processed data to the operation component 103.

The second port crossbar switch matrix 105 is configured to input the second to-be-processed data to the operation component 103.

The operation component 103 is configured to process the first to-be-processed data and the second to-be-processed data according to the execution parameter to obtain a target operation result.

In this embodiment, the operation component 103 may include at least one type of operation component from operation component A to operation component D, and the number of operation components of each type may be one or more. Although only one ALU is used as an example for description in FIG. 2, the example in FIG. 2 is only used for understanding the solution of the present disclosure, and in practical implementations, the number of ALUs may be flexibly determined depending on actual situations, and the number of devices in the ALU may also be flexibly determined depending on actual situations.

The configuration instruction can be used to carry, indicate, or configure an execution parameter, and can also be parsed to generate or obtain an execution parameter.

The configuration instruction can include various possible implementations. For example, the execution parameter may be configured in, for example, but not limited to, a long instruction word (VLIW). The execution parameter may be configured in other manners, such as addressing multiple execution parameters using Reduced Instruction Set Computing (RISC), and writing the transferred parameter data to a fixed address (where the parameter in the form of data in an on-chip or off-chip memory is moved to a destination address through direct addressing/indirect addressing, or the parameter is first moved to a general-purpose register in a processor, and then the value in the general-purpose register is written to the destination address). Further, when the data volume of the execution parameters is large, multiple RISC instructions can also be used to realize the configuration of multiple execution parameters.

For ease of description, in the subsequent embodiments, the solution is described using a long instruction word as the configuration instruction.

The decoding and parameter input channel 101 can receive a very long instruction word (VLIW), where the execution parameter is obtained by parsing the very long instruction word. In certain embodiment(s), the execution parameter can be configured in the very long instruction word before the ALU runs. The very long instruction word can correspond to one operation, or the very long instruction word can correspond to multiple operations. This embodiment is described using an example where the very long instruction word corresponds to multiple operations. In practical implementations, whether the very long instruction word corresponds to one operation or multiple operations may need to be determined depending on actual situations. Referring to FIG. 2, the decoding and parameter input channel 101 receives the execution parameter obtained by parsing the very long instruction word. The very long instruction word can include a table lookup processing instruction, an addition processing instruction, a multiplication processing instruction, and a comparison processing instruction. Each processing instruction carries a corresponding operation parameter, and the decoding and parameter input channel 101 can pass the operation parameter to the corresponding operation component 103. For example, the table lookup processing instruction can carry a table lookup operation parameter, and the addition processing instruction can carry an addition operation parameter. In practical implementations, very long instruction word may also include other instructions and operation parameters corresponding to the other instructions, which will not be exhaustively listed here.

The data input channel 102 can receive first to-be-processed data and second to-be-processed data. Referring to FIG. 2, the data input channel can receive tensor data A (Ta_in), tensor data B (Tb_in), tensor data C (Tc_in), scalar data A (a_in), scalar data B (b_in), scalar Data C (c_in), and a result output address. The first to-be-processed data may be the tensor data A, and the second to-be-processed data may be any of the tensor data A, the tensor data B, the tensor data C, the scalar data A, the scalar data B, or the scalar data C. In certain embodiment(s), the tensor Data A, the tensor data B, and the tensor data C are from an on-chip buffer, the scalar data A, the scalar data B, and the scalar data C can be from instruction parameters, and the precision of the above data includes, but is not limited to, int8, uint8, int32, double precision floating-point (fp64), single precision floating-point (fp32), and half-precision floating-point (fp16).

After the first to-be-processed data is input to the first port crossbar switch matrix 104 through the data input channel 102, the first port crossbar switch matrix 104 can input the first to-be-processed data to the operation component 103. After the second to-be-processed data is input to the second port crossbar switch matrix 105 through the data input channel 102, the second port crossbar switch matrix 105 can input the second to-be-processed data to the operation component 103. After receiving the execution parameter obtained by parsing the very long instruction word, the operation component 103 processes the first to be processed data inputted by the first port crossbar switch matrix 104 and the second to-be-processed data inputted by the second port crossbar switch matrix 105 according to the execution parameter, to obtain the target operation result, and the first port crossbar switch matrix 104 outputs the target operation result. Because of a desire for calculating the square, the first to-be-processed data may need to be simultaneously input to the operation component 103 through the first port crossbar switch matrix 104 and the second port crossbar switch matrix 105, so the data input channel 102 can input the first to be processed data to the first port crossbar switch matrix 104, and can also input the first to-be-processed data and the second to-be-processed data to the second port crossbar switch matrix 105.

For ease of understanding, referring to Table 1 and Table 2, Table 1 is an exemplary table showing the operational statuses of components of a processing component in each clock cycle, and Table 2 is an exemplary table showing the operational statuses of components of a processing component of this embodiment in each clock cycle. Table 1 and Table 2 are only for convenience of understanding this embodiment, and in actual implementations, the number of clock cycles and the types of devices may vary, which will not be exhaustively listed here.

TABLE 1

| Device | Clock cycle 1 | Clock cycle 2 | Clock cycle 3 | Clock cycle 4 | Clock cycle 5 | Clock cycle 6 | Clock cycle 7 |
|---|---|---|---|---|---|---|---|
| Loader | Instruction fetching | Decoding | Executing | Write back | Instruction fetching | Decoding | Executing |
| Multiplier | — | Instruction fetching | Decoding | Executing | Write back | Instruction fetching | Decoding |
| Adder | — | — | Instruction fetching | Decoding | Executing | Write back | Instruction fetching |
| Memory | — | — | — | Instruction fetching | Decoding | Executing | Write back |

TABLE 2

| Device | Clock cycle 1 | Clock cycle 2 | Clock cycle 3 | Clock cycle 4 | Clock cycle 5 | Clock cycle 6 | Clock cycle 7 |
|---|---|---|---|---|---|---|---|
| Loader | Instruction fetching | Decoding | Executing | Executing | Executing | Executing | Executing |
| Multiplier | Instruction fetching | Decoding | Waiting | Executing | Executing | Executing | Executing |
| Adder | Instruction fetching | Decoding | Waiting | Waiting | Executing | Executing | Executing |
| Memory | Instruction fetching | Decoding | Waiting | Waiting | Waiting | Executing | Executing |

It can be seen from Table 1 that the operational statuses of the devices sequentially change according to the clock cycles, and the devices will not be in the same operating state in one clock cycle. When tensor data calculation is performed, one or more instructions is desirable for tensor data at each depth, to make the instruction fetching unit and the decoding unit always in the operating state. That is to say, one instruction is executed in one cycle, and this instruction can be an operation instruction, a wait instruction, an execution instruction, etc. The ALU is driven only when the operation instruction is executed, and the ALU is not driven in every clock cycle, so as not to reduce the efficiency. It can be seen from Table 2 that the devices can be in the same operating state in one clock cycle, so as to support compound operations and parallel execution of multiple components in the ALU. Therefore, the technical solution provided in the present disclosure has relatively higher processing efficiency.

In the embodiments of the present disclosure, a processing component is provided, where the first port crossbar switch matrix and the second port crossbar switch matrix control the input of data so that the data flows to the operation component. The operation component can process the data multiple times in one operation cycle based on the execution parameter, and finally output the operation result, thereby improving the operating efficiency of the processing component.

In certain embodiment(s), based on the embodiment corresponding to FIG. 2, in another embodiment of the processing component provided in the embodiments of the present disclosure, the execution parameter carries an operation mode identifier.

The data input channel 102 is further configured to receive a data write address.

The first port crossbar switch matrix 104 is further configured to read the first to-be-processed data from the data input channel corresponding to a first read address.

The second port crossbar switch matrix 105 is further configured to read the second to-be-processed data from the data input channel corresponding to a second read address.

The operation component 103 is further configured to process data using an operation mode corresponding to the operation mode identifier according to the execution parameter to obtain an intermediate operation result; process the intermediate operation result to obtain the target operation result; and input the target operation result into the first port crossbar switch matrix.

The first port crossbar switch matrix is further configured to output the target operation result according to the data write address.

In this embodiment, an address generation unit (AGU) outside of the ALU can generate dynamic addresses, for example, generate a first read address and a second read address. The first read address corresponds to a data input channel 102, and the first port crossbar switch matrix 104 can read the first to-be-processed data from the data input channel 102 corresponding to the first read address according to the execution parameter. The second read address corresponds to a data input channel 102, and the second port crossbar switch matrix 105 can read the second to-be-processed data from the data input channel 102 corresponding to the second read address according to the execution parameter.

The execution parameter can carry an operation mode identifier, where the operation mode identifier can indicate a corresponding operation mode. Therefore, according to the execution parameter, the operation component 103 can process the data using the operation mode corresponding to the operation mode identifier to obtain an intermediate operation result, and then output the intermediate operation result to the first read address according to the first read address carried in the execution parameter. In addition, the first to-be-processed data and the second to-be-processed data can contain an associated control signal, such as window_start or window_end. The control signal can be transmitted along with the first to-be-processed data and the second to-be-processed data. In the various modules of the ALU, an associated control signal to be used as an effective trigger signal is determined according to a configuration parameter. Therefore, the operation component 103 can process the data in the corresponding operation mode according to the trigger signal to obtain the target operation result, and then output the target operation result to the second read address according to the second address carried in the execution parameter. In certain embodiment(s), the operation mode may include but is not limited to a comparison (CMP) operation mode, an addition (ADD) operation mode, a multiplication (MUL) operation mode, and a table lookup (LUT) operation mode.

The comparison operation mode can be used for data comparison. In certain embodiment(s), FindMax(A) can search a maximum value between start and end points of single input data, and FindMin(A) can search a minimum value between start and end points of single input data.

Max(A, B) is used for double inputs, and can take two data from the port crossbar switch matrix in each clock cycle and obtain the maximum value of the two. Min(A, B) is also used for double inputs, and can take two data from the port crossbar switch matrix in each clock cycle and obtain the minimum value of the two.

Abs(A) is used for a single input and can calculate the absolute value of the input data.

(data>scalar_a) if data:scalar b, and (data<scalar_a) if data:scalar b are used for three inputs, That is, when the conditions in brackets are true, the corresponding data before the colon is output; when the conditions in brackets are false, the corresponding data after colon is output. For example, if scalar_a is –1, scalar b is 1, and data is 0, then (data>scalar_a) if data:scalar b can output 0, and (data<scalar_a) if data:scalar b can output 1.

Max(Min(A, scalar_a), scalar b) where scalar_a>scalar b is used for three inputs, and is used for clamping. Two thresholds are set for clamping. When an input is greater than the greater threshold, the greater threshold is output; or when an input is less than the smaller threshold, the smaller threshold is output. That is to way, by clamping, only values between the thresholds can be output. For example, the thresholds are 1 and –1. When the input data is –5, the output data is –1; when the input data is 3, the output data is 1.

The addition operation mode can add up the two data. In certain embodiment(s), Add(A, B) is used for double inputs, can take two data from the port crossbar switch matrix and obtain the sum of the two, and is suitable for scalar data. For example, if two data, 2 and 6, are acquired in a clock cycle, then Add(A, B) can output 8. In practical implementations, the vector processor may include multiple ALUs. Each ALU corresponds to one channel in the C direction. When the adder is configured in the Add(A, B) mode, all the ALUs in the C channel simultaneously implement an addition operation to output a vector, where each of the ALUs outputs one element in the vector. In this implementation, the element can be called a scalar. Therefore, operations in the Add(A, B) mode can also be performed.

Accumulator(A) is used for single input, and can sum data between data start and end points. For example, if data inputted in the first clock cycle is 5 and data inputted in the second clock cycle is 8, Accumulator(A) can output 13.

Sub(A, B) is used for double inputs, can take two data from the port crossbar switch matrix and obtain the difference between the two, and is only used for scalar data and data volume data. For example, if two data, 6 and 2, are acquired in a clock cycle, then Sub(A, B) can output 4. The multiplication operation mode is similar to the addition operation mode.

The table lookup operation mode can be implemented by table lookup with linear interpolation. For ease of understanding, referring to Table 3, Table 3 is an exemplary table in the table lookup operation mode in this embodiment.

TABLE 3

| Key | Value |
| --- | --- |
| 1 | 5 |
| 3 | 6 |
| 5 | 7 |
| 7 | 8 |
| 9 | 9 |
| 11 | 10 |

It can be seen from Table 3 that in the exemplary table corresponding to the table lookup operation mode, the input data and the output data have a one-to-one correspondence. For example, if the input data is 3, the value found by table lookup is 6. If the input data is 8, a value may need to be obtained through linear interpolation. To be specific, the input data 8 is inserted between 7 and 9 to simulate a value, for example, 8.5. This embodiment is merely described by using averaging as an example. In actual implementations, calculations may also be performed based on other methods such as variance and standard deviation, which are not limited in this embodiment.

For ease of understanding, this embodiment is described using an example where the intermediate operation result is a value output in one clock cycle. In practical implementations, the intermediate operation result represents an operation result outputted in one clock cycle, the operation result can be a vector, and for multiple clock cycles, a corresponding data flow will be obtained.

In the embodiments of the present disclosure, by the above method, the operation component can determine the operation mode and process the data based on the execution parameter, and finally output the operation result to the corresponding output address, thereby improving the accuracy and operating efficiency of the processing component.

In certain embodiment(s), based on the embodiment corresponding to FIG. 2, in another embodiment of the processing component provided in the embodiments of the present disclosure, the data input channel 102 is further configured to receive a control signal and a window identifier, wherein the control signal includes at least one of a feature map end flag or a data valid flag, wherein the feature map end flag represents a last piece of data in a feature map, and the data valid flag represents enabling the ALU; and the window identifier includes at least one of a window start identifier and a window end identifier, wherein the window start identifier represents a first piece of data in a window, and the window end identifier represents a last piece of data in a window.

In this embodiment, the data input channel 102 can also receive a control signal and a window identifier, wherein the control signal includes at least one of a feature map end flag or a data valid flag, wherein the feature map end flag can represent a last piece of data in a feature map, and the data valid flag represents enabling the ALU, is in certain embodiment(s) used to drive the execution component desirable by the current operation in the ALU. For example, if the current operation is a computing operation, it drives the components related to data forwarding, computing and precision conversion in the ALU. The window identifier includes at least one of a window start identifier (window_start) and a window end identifier (window_end), wherein the window start identifier can represent a first piece of data in a window, and the window end identifier represents a last piece of data in a window.

Figure 3:
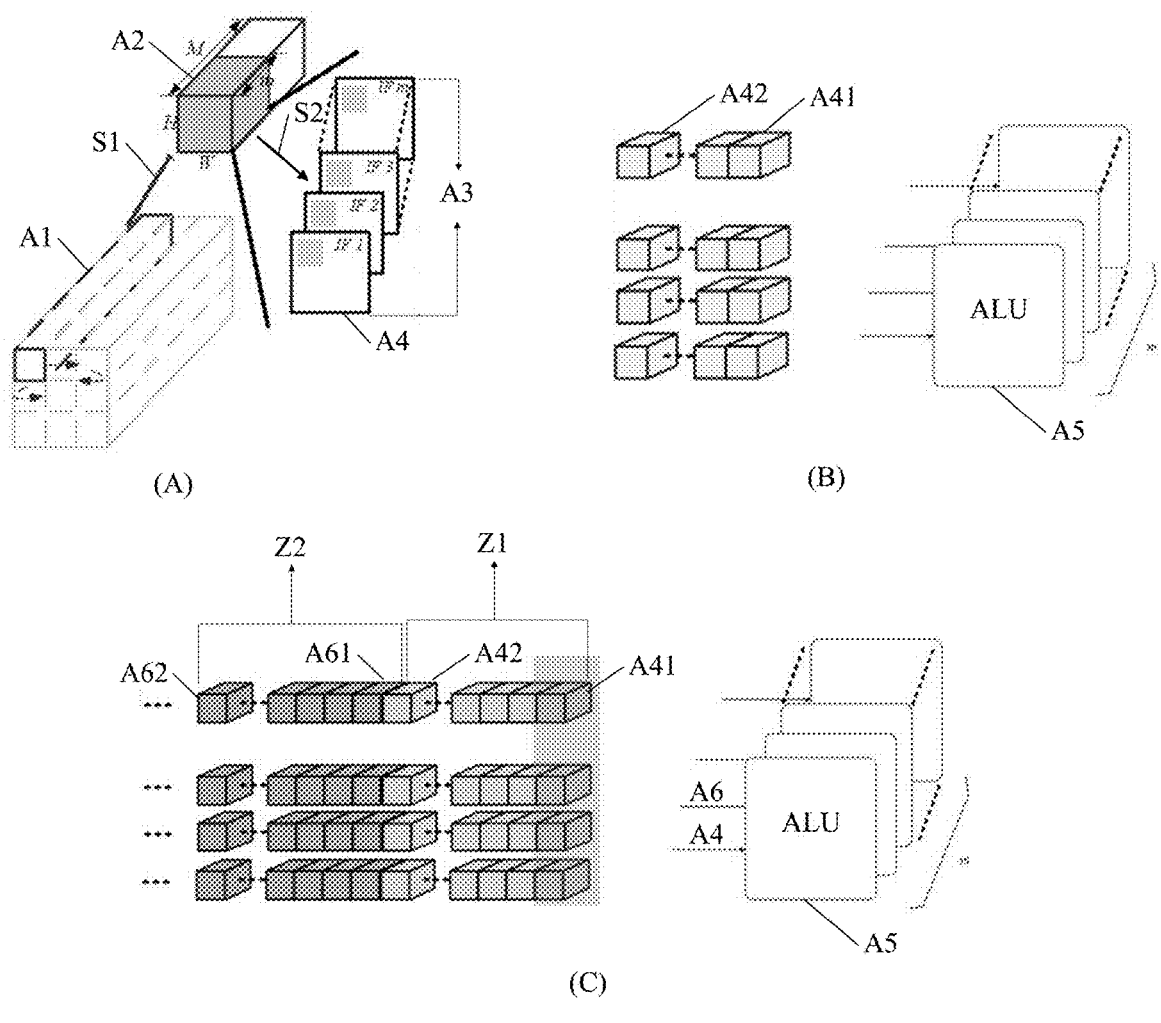
FIG. 3 is a schematic diagram of to-be-processed data according to embodiment(s) of the present disclosure.

For ease of understanding, a description is given using an example where the to-be-processed data is tensor data. Referring to FIG. 3, FIG. 3 is a schematic diagram of an embodiment of to-be-processed data in the embodiments of the present disclosure. As shown in the figure, tensor A1 shown in (A) in FIG. 3 can be stored in an off-chip memory. If the data volume of the tensor A1 is relatively large, a part of the tensor A1 may need to be loaded from the off-chip memory through step S1 to obtain a sub-tensor A2. In certain embodiment(s), when the height and width of the tensor A1 are large, for example, when the tensor A1 is 1024 (height) *1024 (width)*128 (depth), in step S1, the tensor with a depth of 128 can be cut first, and then the tensor is cut to obtain the sub-tensor A2. When the height and width of the tensor A1 are small, for example, when the tensor A1 is 128 (height)*128 (width)*128 (depth), in step S1, the tensor A1 can be directly cut into several parts to obtain the sub-tensor A2. The depth of A2 is less than or equal to the depth of A1.

After the sub-tensor A2 is obtained through step S1, if the depth of the sub-tensor A2 is M and the number of ALUs is m, then a part with a depth of m can be cut from the sub-tensor A2, to obtain tensor data A3 shown in (A) in FIG. 3. Assuming that the depth of the tensor data A3 is m, the tensor data A3 can be processed using a sliding window in the height and width directions, to obtain window data A4 with a depth of m.

According to a parameter configuration of an address reading module of the control part, the AGU outside the ALU can sequentially read data in the window data A4 from an on-chip buffer each time the window is slid by one stride on the two-dimensional data of each depth. In this implementation, the data read from multiple pieces of window data A4 forms a continuous data flow. In each clock cycle, m pieces of data of different depths and the same coordinates in the window are input to m ALUs for processing. The window data A4 can include multiple pieces of data (for example, 3*3*m pieces of data). (B) in FIG. 3 shows multiple pieces of data in the window data A4. The first vector data of the first window in a tensor can carry the data valid flag, and the last vector data in a feature map can carry the feature map end flag. The window data A4 is input to an ALU A5, and the ALU A5 can receive a control signal the data input channel. The control signal includes at least one of the feature map end flag or the data valid flag. If the ALU A5 obtains the data valid flag, it can enable the ALU and start to perform operations. When the ALU A5 obtains the feature map end flag, it indicates that the operation of the feature map is performed.

The tensor data A3 can include m feature maps, so each of the m feature maps can include multiple pieces of data to form a vector. For the data under multiple windows as shown in (C) in FIG. 3, in order to distinguish data corresponding to different windows, an identifier can be added to the first piece of data and the last piece of data in each window. For example, the first piece of data A41 in a window Z1 carries a window start identifier, the last piece of data A42 in this window Z1 can carry a window end identifier. For another example, the first piece of data A61 in a next window Z2 carries a window start identifier, and the last piece of data A62 in this window Z2 carries a window end identifier. Data in the window Z1 and the window Z2 are input to the ALU A5, and the ALU A5 can receive a window identifier through the data input channel. The window identifier includes at least one of a window start identifier or a window end identifier. Therefore, when the ALU A5 obtains the window start identifier carried in the first piece of data A41, it can be determined that currently the data in the window Z1 is being computed; and when the ALU A5 obtains the window end identifier carried in the last piece of data A42, it can be determined that the input of the data in the window Z1 has been performed. When the ALU A5 obtains the window start identifier carried in the first piece of data A61, it is determined that currently the data in the window Z2 is being computed; and when the ALU A5 obtains the window end identifier carried in the last piece of data A62, it can be determined that the input of the data in the window Z2 has been performed.

The example in FIG. 3 is only used for understanding the solution of the present disclosure. In practical implementations, the feature map and the number of ALUs may be flexibly determined depending on actual situations.

When a window-related operation, such as FindMax(A), FindMin(A), or Accumulator(A) is executed, the first piece of data is written to an internal register when the window start identifier is enabled. When the window end identifier is enabled, outputting of a data valid signal is enabled, and the internal register is cleared. For pointwise operations, each data is the first piece of data of the window and the last piece of data in the window. The window start identifier and the window end identifier are always enabled at the same time.

Based on the above description, the processing component may include multiple ALUs. It is assumed that there is one ALU and another ALU parallel to the ALU (which is called a parallel ALU). Similar to the ALU, the parallel ALU shares the same execution parameter and control parameter with the ALU, and outputs a parallel operation result in the target clock cycle. At the same time, the ALU also outputs the target operation result in the target clock cycle. There are Y ALUs working in parallel in the processing component, and Y operation results are output in the same clock cycle. For a single ALU, the output is a scalar data stream. For multiple ALUs, the output is a vector.

In this embodiment of the implementation, the data input channel can also receive a control signal and a window identifier. By the above method, the ALU can enable or disable the data input based on the identifier carried in the control signal, and the execution mode of the ALU operation component can be adjusted without interrupting the data flow and without re-decoding, which ensures the continuous operation of the ALU operation component, thereby improving the operating efficiency of the processing component.

Figure 4:
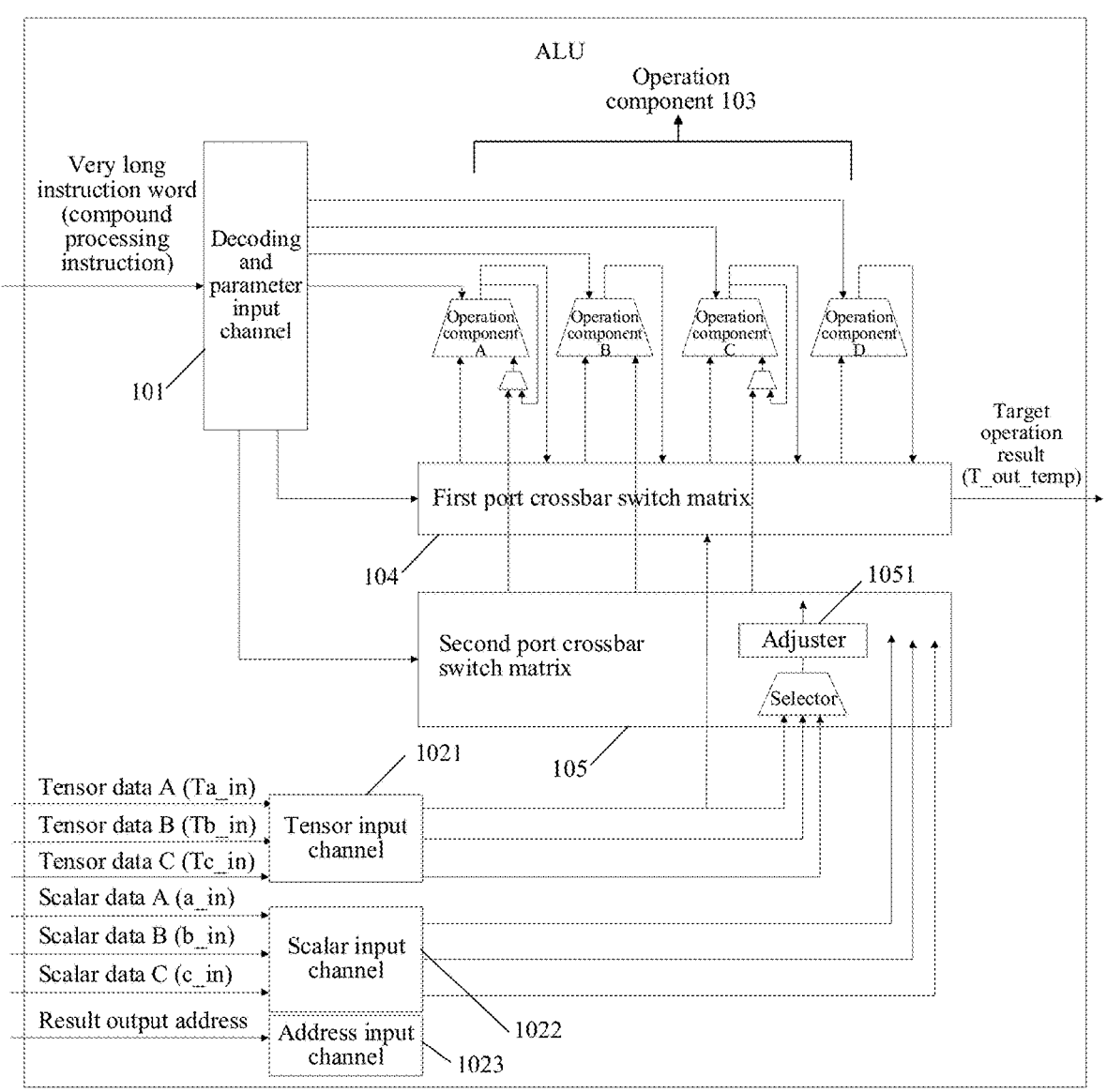
FIG. 4 is a schematic diagram of a processing component according to embodiment(s) of the present disclosure.

In certain embodiment(s), based on the embodiment corresponding to FIG. 2, further referring to FIG. 4, in another embodiment of the processing component provided in the embodiments of the present disclosure, the data input channel 102 includes at least a tensor input channel 1021, a scalar input channel 1022, and an address input channel 1023.

The tensor input channel 1021 is configured to receive at least one of the first to-be-processed data or the second to-be-processed data, wherein the first to-be-processed data and the second to-be-processed data are both data included in a tensor.

The scalar input channel 1022 is configured to receive the second to-be-processed data, wherein the second to-be-processed data is data corresponding to a scalar.

The address input channel 1023 is configured to receive a result output address, wherein the result output address is an address written into a memory.

In this embodiment, the data input channel 102 includes at least a tensor input channel 1021, a scalar input channel 1022, and an address input channel 1023. The tensor input channel 1021 can receive at least one of the first to-be-processed data or the second to-be-processed data. The scalar input channel 1022 can receive the second to-be-processed data, wherein the second to-be-processed data is data corresponding to a scalar. The address input channel 1023 can receive a result output address, wherein the result output address is an address written into a memory.

In certain embodiment(s), the tensor input channel 1021 can receive tensor data A (Ta_in), tensor data B (Tb_in), and tensor data C (Tc_in). The scalar input channel 1022 can receive scalar data A (a_in), scalar data B (b_in), and scalar Data C (c_in). The tensor input channel 1023 can input tensor data A (Ta_in) to the first port crossbar switch matrix 104, and can also input tensor data A (Ta_in), tensor data B (Tb_in), and Tensor data C (Tc_in) to the second port crossbar switch matrix 105. The scalar input channel 1022 can input scalar data A (a_in), scalar data B (b_in), and scalar data C (c_in) to the second port crossbar switch matrix 105. The address input channel 1023 can receive a result output address, where the result output address can indicate an address that is finally written to the memory.

Although only one tensor input channel, one scalar input channel, and one address input channel are used as examples for description in FIG. 4, the example in FIG. 4 is only used for understanding the solution of the present disclosure, and in practical implementations, the numbers of tensor input channels, scalar input channels, and address input channels may all be flexibly determined depending on actual situations.

In the embodiments of the present disclosure, by the above method, the asynchronous data reading is changed to the synchronous input of the data flow, which improves the efficiency and stability of data reading, thereby improving the accuracy and operation efficiency of the processing component.

In certain embodiment(s), based on the embodiment corresponding to FIG. 2, in another embodiment of the processing component provided in the embodiments of the present disclosure, the second port crossbar switch matrix 105 includes a delay adjuster 1051.

The first port crossbar switch matrix 104 is further configured to input the first to-be-processed data to the operation component 103 in a first clock cycle.

The operation component 103 is further configured to output an intermediate operation result to the first port crossbar switch matrix 104 in a second clock cycle by the operation component, wherein the intermediate operation result is obtained from an operation performed according to the first to-be-processed data, and the second clock cycle and integer greater than or equal to 1 and N is an integer greater than or equal to M. In certain embodiment(s), the clock cycle can be determined according to the execution frequency of the processing component. For example, when the execution frequency of the processing component is 1 GHz, one clock cycle is 1 ns.

Because the scalar data is static and the tensor data is dynamic, if the second to-be-processed data is tensor data, the second to-be-processed data may need to be input to the delay adjuster 1051, so that the delay adjuster 1051 delays the second to-be-processed data. The delay adjuster 1051 can input the second to-be-processed data to the operation component 103. If the second to-be-processed data is scalar data, the second to-be-processed data does not need to be input to the delay adjuster 1051, but instead is directly input to the transmission channel of the second port crossbar switch matrix 105.

For ease of understanding, referring to Table 4, Table 4 is an exemplary table showing the statuses of components in different clock cycles under the control of a delay adjuster. Table 4 is only for convenience of understanding this embodiment, and in actual implementations, the number of clock cycles and the types of devices may vary, which will not be exhaustively listed here.

TABLE 4

| Device | Clock cycle 1 | Clock cycle 2 | Clock cycle 3 | Clock cycle 4 | Clock cycle 5 | Clock cycle 6 | Clock cycle 7 |
|---|---|---|---|---|---|---|---|
| First port crossbar switch matrix | Instruction fetching | Decoding | Executing | Executing | Executing | Executing | Executing |
| Second port crossbar switch matrix | Instruction fetching | Decoding | Executing | Executing | Executing | Executing | Executing |
| Operation component | Instruction fetching | Decoding | Waiting | Executing | Executing | Executing | Executing |
| Delay adjuster | Instruction fetching | Decoding | Executing | Executing | Executing | Executing | Executing | the first clock cycle are spaced by M clock cycles, wherein M is an integer greater than or equal to 1.

The first port crossbar switch matrix 104 is further configured to input the intermediate operation result to the operation component 103 in a third clock cycle, wherein the third clock cycle and the first clock cycle are spaced by N clock cycles, wherein N is an integer greater than or equal to M.

The delay adjuster 1051 is configured to input the second to-be-processed data to the operation component 103 in the third clock cycle.

In this embodiment, the second port crossbar switch matrix 105 can also include a delay adjuster 1051, the first port crossbar switch matrix 104 can input the first to-be-processed data to the operation component 103 in the first clock cycle, and then the operation component 103 can process the first to-be-processed data in the second clock cycle to obtain an intermediate operation result, and output the intermediate operation result to the first port crossbar switch matrix 104. The second clock cycle and the first clock cycle are spaced by M clock cycles. Further, the first port crossbar switch matrix 104 can further input the intermediate operation result to the operation component 103 in a third clock cycle, wherein the third clock cycle and the first clock cycle are spaced by N clock cycles. The delay adjuster 1051 inputs the second to-be-processed data to the operation component 103 in the third clock cycle, where M is an It can be seen from Table 4 that in the clock cycle 1, the first port crossbar switch matrix 104, the second port crossbar switch matrix 105, the operation component 103, and the delay adjuster 1051 can all acquire the parsing result of the very long instruction word. In the clock cycle 2, the first port crossbar switch matrix 104, the second port crossbar switch matrix 105, the operation component 103, and the delay adjuster 1051 can perform decoding operations, so the first port crossbar switch matrix 104 can decode the first to-be-processed data, and the second port crossbar switch matrix 105 can decode the second to-be-processed data. In the clock cycle 3, the first port crossbar switch matrix 104 inputs the decoded first to-be-processed data to the operation component 103, and the second port crossbar switch matrix 105 inputs the decoded second to-be-processed data to the operation component 103 through the delay adjuster 1051. Then, in the clock cycle 4, the operation component 103 processes the first to-be-processed data and the second to-be-processed data to obtain the intermediate operation result. In the clock cycle 5, the operation component 103 outputs the intermediate operation result to the first port crossbar switch matrix 104. In the clock cycle 6, the first port crossbar switch matrix 104 inputs the intermediate operation result to the operation component 103, and the second port crossbar switch matrix 105 inputs the second to-be-processed data to the operation component 103 through the delay adjuster 1051, so that the operation component 103 completes compound operations.

In this embodiment, only an operation process of one piece of first to-be-processed data and one piece of second to-be-processed data is described, and the devices in the processing component process a set of data in one clock cycle. In practical implementations, a plurality of pieces of first to-be-processed data and a plurality of pieces of second to-be-processed data can be processed, and the devices in the processing component can also process a plurality of sets of data in one clock cycle, which is not limited here.

In the embodiments of the present disclosure, by the above method, the second to-be-processed data can be input after the operation on the first to-be-processed data is performed, so as to control the data input and ensure the correctness of data operations in the implementation of a continuous input.

Figure 5:
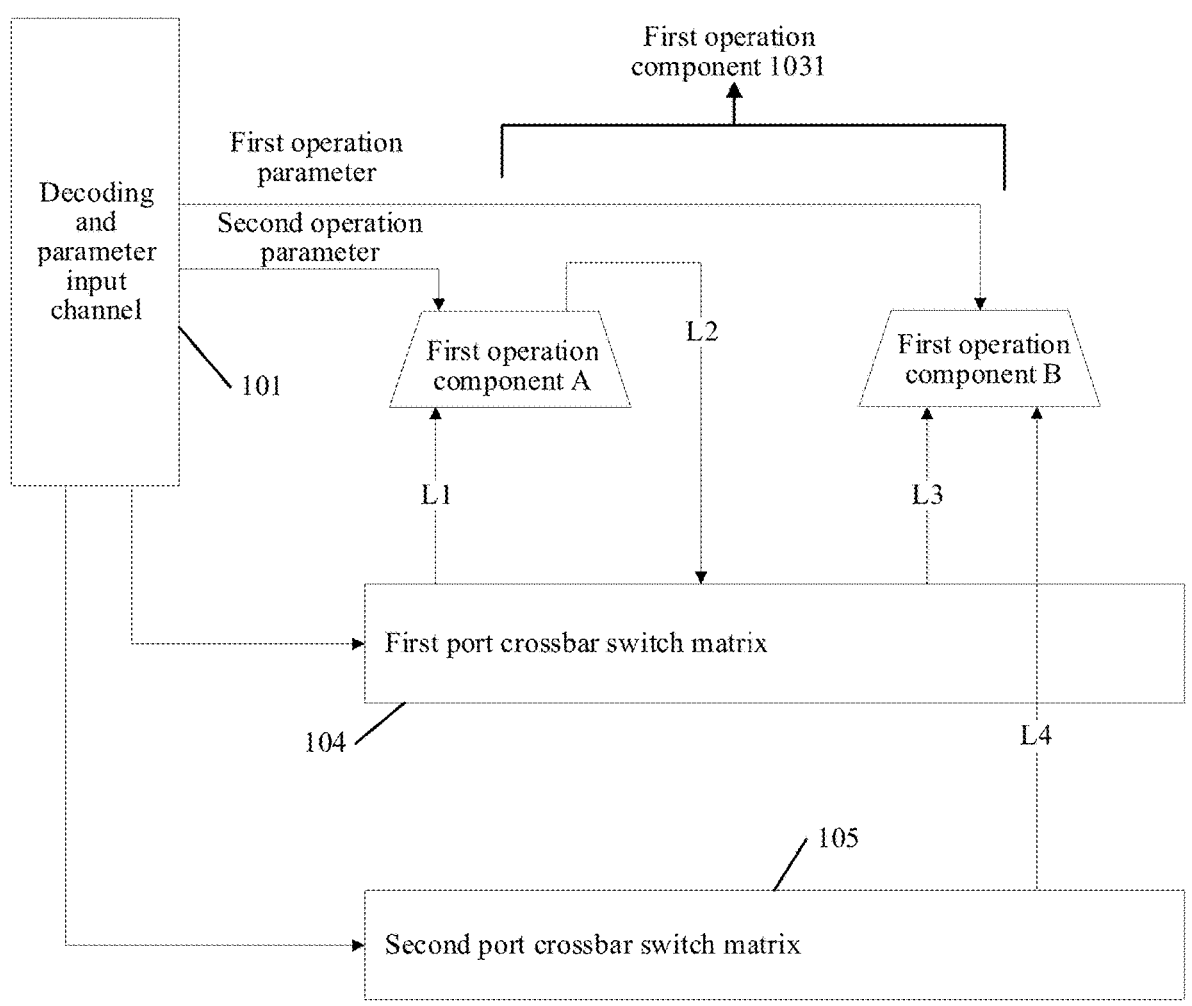
FIG. 5 is a schematic diagram of a data flow direction according to embodiment(s) of the present disclosure.

In certain embodiment(s), based on the embodiment corresponding to FIG. 2, further referring to FIG. 5, in another embodiment of the processing component provided in the embodiments of the present disclosure, the operation component 103 includes at least a first operation component 1031.

The first port crossbar switch matrix 104 is further configured to input the first to-be-processed data to the first operation component 1031.

The second port crossbar switch matrix 105 is further configured to input the second to-be-processed data to the first operation component 1031.

The first operation component 1031 is configured to process the first to-be-processed data according to the execution parameter to obtain an intermediate operation result.

The first operation component 1031 is further configured to output the intermediate operation result to the first port crossbar switch matrix 104.

The first port crossbar switch matrix 104 is further configured to input the intermediate operation result to the first operation component 1031.

The second operation component 1031 is configured to process the intermediate operation result and the second to-be-processed data according to the execution parameter to obtain the target operation result.

In this embodiment, the operation component 103 may include at least a first operation component 1031, and the first operation component 1031 includes at least one operation component of the same type, for example, an adder or two comparators. The first port crossbar switch matrix 104 can input the first to-be-processed data to one first operation component 1031, and the second port crossbar switch matrix 105 can input the second to-be-processed data to another first operation component 1031. The first operation component 1031 can process the first to-be-processed data according to the execution parameter to obtain an intermediate operation result, and the first operation component 1031 outputs the intermediate operation result to the first port crossbar switch matrix 104. The first port crossbar switch matrix 104 can input the intermediate operation result to another first operation component 1031, and the another first operation component 1031 processes the intermediate operation result and the second to-be-processed data according to the execution parameter to obtain the target operation result. For example, when there is one ALU which is an adder, the adder can output the intermediate operation result to the first port crossbar switch matrix 104, and then the first port crossbar switch matrix 104 inputs the intermediate operation result to a comparator. When there are two ALUs which include an adder A and an adder B or a comparator A, the adder A may output the intermediate operation result to the first port crossbar switch matrix 104, and then the first port crossbar switch matrix 104 inputs the intermediate operation result to the adder B or the comparator A.

As shown in FIG. 5, the first operation component 1031 includes a first operation component A and a first operation component B. In step L1, the first to-be-processed data can be input to the first operation component A in the first operation component 1031 through the first port crossbar switch matrix 104. In step L2, the first operation component A processes the acquired first to-be-processed data according to the execution parameter to obtain an intermediate operation result. In step L3, the first port crossbar switch matrix 104 inputs the intermediate operation result to the first operation component B in the first operation component 1031, and at the same time, in step L4, the second port crossbar switch matrix 105 inputs the second to-be-processed data to the first operation component B, so that the first operation component B can process the intermediate operation result and the second to-be-processed data according to the execution parameter to obtain the target operation result.

The decoding and parameter input channel 101 can acquire an execution parameter, inputs the execution parameter to the first operation component A in the first operation component 1031, and inputs the execution parameter to the first operation component B in the first operation component 1031.

A description is given below using an example where the operation mode is a comparison operation mode and the first operation components all use Max(A, B). It is assumed that the first operation component 1031 includes a comparator A and a comparator B. In step L1, the first port crossbar switch matrix 104 inputs the first to-be-processed data 15 to the comparator A, and at the same time, in step L2, the second to-be-processed data 8 is input to the comparator A through the second port crossbar switch matrix 105, and the comparator A processes the first to-be-processed data 15 and the second to-be-processed data 8 through Max(A, B), to obtain the intermediate operation result 15. In step L3, the comparator A outputs the intermediate operation result 15 to the first port crossbar switch matrix 104. In step L4, the first port crossbar switch matrix 104 inputs the intermediate operation result 15 to the comparator B, and the comparator B can process the intermediate operation result 15 and the second to-be-processed data 8 through Max(A, B) to obtain the target operation result 15.

Although FIG. 5 shows an example where the first operation component includes two components, the example in FIG. 5 is only used for understanding the solution of the present disclosure. In practical implementations, the first operation component may be composed of multiple components, and the multiple components adopt operation modes of the same type. For example, the first operation component includes three comparators, or the first operation component includes two multipliers. The operation modes of the same type can use different operation functions. Although the use of the same operation function is described as an example in this embodiment, this example is not a limitation to the present disclosure. The number of components in the first operation component may be flexibly determined depending on actual situations.

In the embodiments of the present disclosure, by the above method, operations of the same type can be performed by multiple operation components in the first operation component, which can reduce data processing conflicts, thereby improving the operating efficiency of the processing component.

Figure 6:
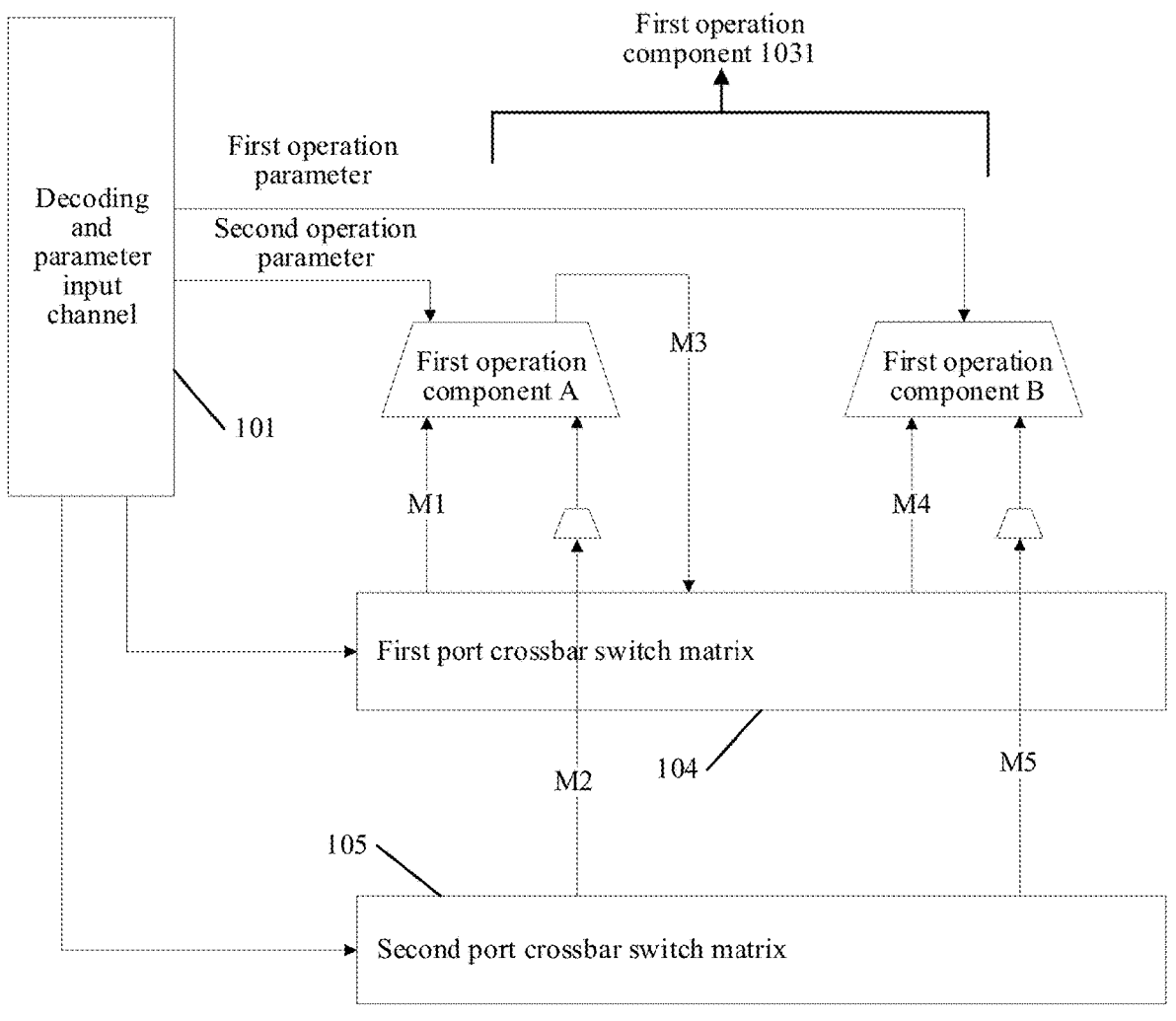
FIG. 6 is a schematic diagram of another data flow direction according to embodiment(s) of the present disclosure.

In certain embodiment(s), based on the embodiment corresponding to FIG. 2, referring to FIG. 6, in another embodiment of the processing component provided in the embodiments of the present disclosure, the operation component 103 includes at least a first operation component 1031.

The first port crossbar switch matrix 104 is further configured to input the first to-be-processed data to the first operation component 1031.

The second port crossbar switch matrix 105 is further configured to input the second to-be-processed data to the first operation component 1031.

The first operation component 1031 is configured to process the first to-be-processed data and the second to-be-processed data according to the execution parameter to obtain an intermediate operation result.

The first operation component 1031 is further configured to output the intermediate operation result to the first port crossbar switch matrix 104.

The first port crossbar switch matrix 104 is further configured to input the intermediate operation result to the first operation component 1031.

The second operation component 1031 is configured to process the intermediate operation result and the second to-be-processed data according to the execution parameter to obtain the target operation result.

In this embodiment, the operation component 103 may include at least a first operation component 1031. The first port crossbar switch matrix 104 can input the first to-be-processed data to one first operation component 1031, and the second port crossbar switch matrix 105 can input the second to-be-processed data to the first operation component 1031. The first to-be-processed data and the second to-be-processed data are input simultaneously. Then, the first operation component 1031 can process the first to-be-processed data and the second to-be-processed data according to the execution parameter to obtain an intermediate operation result, and then the first operation component 1031 can further output the obtained intermediate operation result to the first port crossbar switch matrix 104. Next, the first port crossbar switch matrix 104 can input the obtained intermediate operation result to another first operation component 1031, and finally the another first operation component 1031 can process the intermediate operation result and the second to-be-processed data according to the execution parameter to obtain the target operation result.

As shown in FIG. 6, the first operation component 1031 includes a first operation component A and a first operation component B. In step M1, the first to-be-processed data is input to the first operation component A in the first operation component 1031 through the first port crossbar switch matrix 104. In step M2, the second to-be-processed data is input to the first operation component A in the first operation component 1031 through the second port crossbar switch matrix 105. Step M1 and step M2 are performed simultaneously. The first operation component 1031 can receive an execution parameter. Then the first operation component A in the first operation component 1031 can process the first to-be-processed data obtained in step M1 and the second to-be-processed data obtained in step M2 according to the execution parameter to obtain an intermediate operation result. In step M3, the first operation component A inputs the intermediate operation result to the first port crossbar switch matrix 104. In step M4, the first port crossbar switch matrix 104 inputs the intermediate operation result to the first operation component B in the first operation component 1031, and at the same time, in step M5, the second port crossbar switch matrix 105 also inputs the second to-beprocessed data to the first operation component B in the first operation component 1031, so that the first operation component B can process the intermediate operation result and the second to-be-processed data according to the obtained execution parameter to obtain the target operation result.

A description is given below using an example where the operation mode is a comparison operation mode and the first operation components all use Max(A, B). It is assumed that the first operation component 1031 includes a comparator A and a comparator B. In step M1, the first port crossbar switch matrix 104 inputs the first to-be-processed data 15 to the comparator A, and at the same time, in step M2, the second to-be-processed data 28 is input to the comparator A through the second port crossbar switch matrix 105. Step M1 and step M2 are performed simultaneously. The comparator A processes the first to-be-processed data 15 and the second to-be-processed data 28 through Max(A, B), to obtain the intermediate operation result 28. In step M3, the comparator A outputs the intermediate operation result 28 to the first port crossbar switch matrix 104. In step M4, the first port crossbar switch matrix 104 inputs the intermediate operation result 28 to the comparator B, and the comparator B can process the intermediate operation result 28 and the second to-be-processed data 28 through Max(A, B) to obtain the target operation result 28.

Although FIG. 6 shows an example where the first operation component includes two components, the example in FIG. 6 is only used for understanding the solution of the present disclosure. In practical implementations, the first operation component may be composed of multiple components, and the multiple components adopt operation modes of the same type. For example, the first operation component includes three comparators, or the first operation component includes two multipliers. The operation modes of the same type can use different operation functions. Although the use of the same operation function is described as an example in this embodiment, this example is not a limitation to the present disclosure. The number of components in the first operation component may be flexibly determined depending on actual situations.

In the embodiments of the present disclosure, by the above method, different data can be processed simultaneously, thereby improving the operating efficiency of the processing component.

Figure 7:
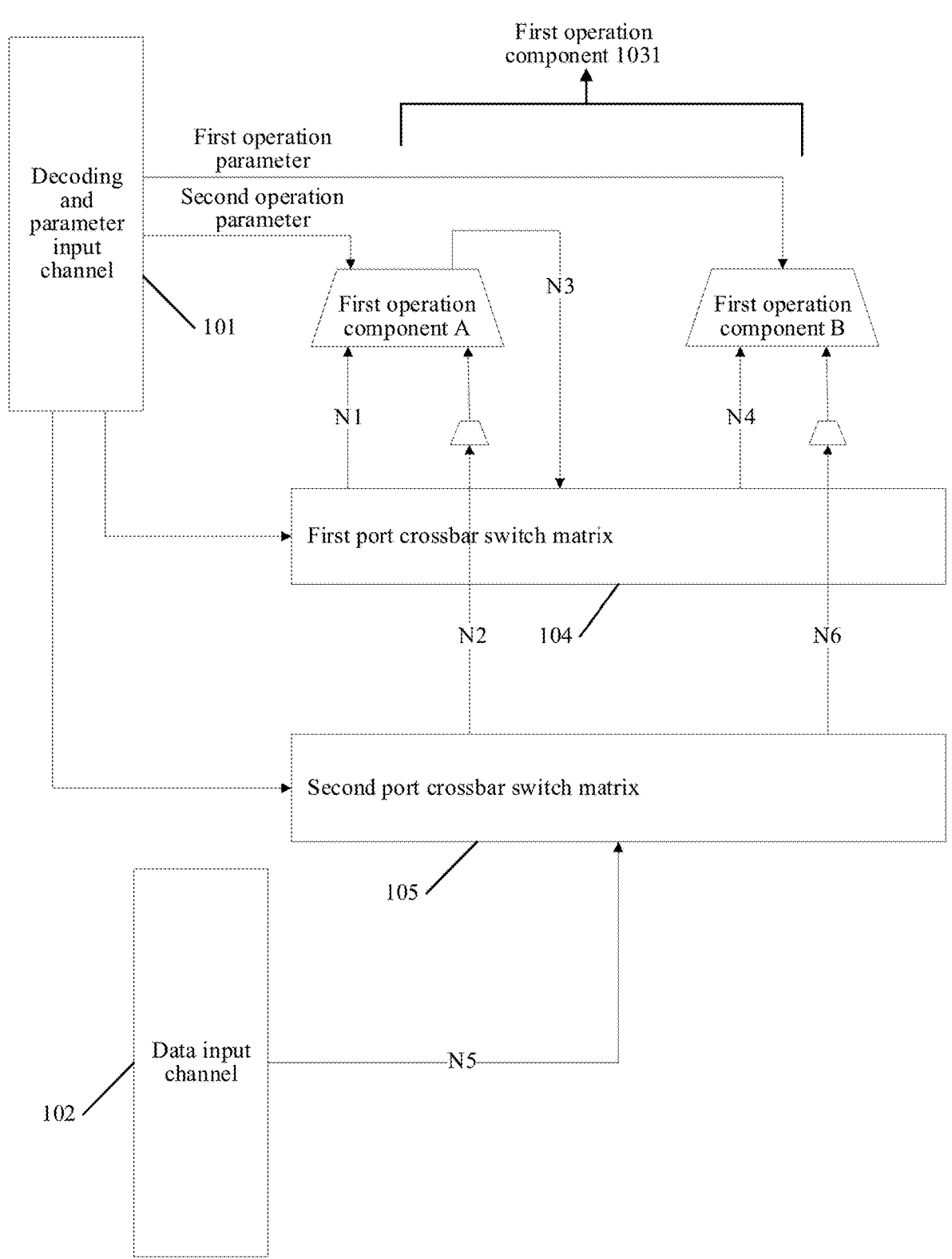
FIG. 7 is a schematic diagram of another data flow direction according to embodiment(s) of the present disclosure.

In certain embodiment(s), based on the embodiment corresponding to FIG. 2, referring to FIG. 7, in another embodiment of the processing component provided in the embodiments of the present disclosure, the operation component 103 includes at least a first operation component 1031.

The data input channel 102 is further configured to receive third to-be-processed data.

The first port crossbar switch matrix 104 is further configured to input the first to-be-processed data to the first operation component 1031.

The second port crossbar switch matrix 105 is further configured to input the second to-be-processed data and the third to-be-processed data to the first operation component 1031.

The first operation component 1031 is configured to process the first to-be-processed data and the second to-be-processed data according to the execution parameter to obtain an intermediate operation result.

The first operation component 1031 is further configured to output the intermediate operation result to the first port crossbar switch matrix 104.

The first port crossbar switch matrix 104 is further configured to input the intermediate operation result to the first operation component 1031.

The second operation component 1031 is configured to process the intermediate operation result and the third to-be-processed data according to the execution parameter to obtain the target operation result.

In this embodiment, the operation component 103 may include at least the first operation component 1031, and the data input channel 102 may also receive third to-be-processed data. The first port crossbar switch matrix 104 can input the first to-be-processed data to one first operation component 1031, the second port crossbar switch matrix 105 can input the second to-be-processed data and the third to-be-processed data to the first operation component 1031, and then the first operation component 1031 processes the first to-be-processed data and the second to-be-processed data according to the execution parameter to obtain an intermediate operation result. The first operation component 1031 can further output the intermediate operation result to the first port crossbar switch matrix 104. The first port crossbar switch matrix 104 inputs the intermediate operation result to another first operation component 1031, and the another first operation component 1031 processes the intermediate operation result and the third to-be-processed data according to the execution parameter to obtain the target operation result. The second to-be-processed data and the third to-be-processed data are input to the first operation component 1031 simultaneously by the second port crossbar switch matrix 105.

As shown in FIG. 7, the first operation component 1031 includes a first operation component A and a first operation component B. In step N1, the first to-be-processed data may be input to the first operation component A in the first operation component 1031 through the first port crossbar switch matrix 104. In step N2, the second to-be-processed data and the third to-be-processed data may be input to the first operation component A in the first operation component 1031 through the second port crossbar switch matrix 105. Step N1 and step N2 are performed simultaneously. The first operation component A in the first operation component 1031 can receive the execution parameter, and the first operation component B in the first operation component 1031 can also receive the execution parameter. The first operation component A can process the first to-be-processed data and the second to-be-processed data according to the execution parameter to obtain an intermediate operation result. In step N3, the first operation component A inputs the intermediate operation result to the first port crossbar switch matrix 104. In step N4, the intermediate operation result is input to the first operation component B in the first operation component 1031 through the first port crossbar switch matrix 104. In step N5, the data input channel 102 can receive the third to-be-processed data, and then input the third to-be-processed data to the second port crossbar switch matrix 105. Then, in step N6, the third to-be-processed data is input to the first operation component B in the first operation component 1031 through the second port crossbar switch matrix 105, so that the first operation component B processes the intermediate data operation result and the third to-be-processed data according to the execution parameter obtained above to obtain the target operation result.

FIG. 7 shows a flowchart in which the first to-be-processed data is tensor data in this embodiment. In practical implementations, if the first to-be-processed data is tensor data, the first to-be-processed data is input to the first port crossbar switch matrix 104, and the first port crossbar switch matrix 104 inputs data to the first operation component A in the first operation component 1031. If the first to-be-processed data, the second to-be-processed data, and the third to-be-processed data are all tensor data, the first to-be-processed data is only input to the first port crossbar switch matrix 104, the first port crossbar switch matrix 104 inputs data is to the first operation component A in the first operation component 1031, the second to-be-processed data and the third to-be-processed data are only input to the second port crossbar switch matrix 105, and the second port crossbar switch matrix 105 inputs data to the first operation component A in the first operation component 1031. If the first to-be-processed data, the second to-be-processed data, and the third to-be-processed data are all scalar data, then the first to-be-processed data, the second to-be-processed data, and the third to-be-processed data are only input to the second port crossbar switch matrix 105, and the second port crossbar switch matrix 105 inputs data to the first operation component A in the first operation component 1031.

Further, a description is given below using an example where the operation mode is a comparison operation mode and the first operation components all use Max(A, B). It is assumed that the first operation component 1031 includes a comparator A and a comparator B. In step N1, the first port crossbar switch matrix 104 inputs the first to-be-processed data 15 to the comparator A. In step N2, the second to-be-processed data 28 is input to the comparator A through the second port crossbar switch matrix 105, and the comparator A processes the first to-be-processed data 15 and the second to-be-processed data 28 through Max(A, B), to obtain the intermediate operation result 28. In step N3, the comparator A outputs the intermediate operation result 28 to the first port crossbar switch matrix 104. In step N4, the first port crossbar switch matrix 104 inputs the intermediate operation result 28 to the comparator B, and at the same time, in step N5, the second port crossbar switch matrix 105 inputs the third to-be-processed data 50 to the comparator B, so that the comparator B can process the intermediate operation result 28 and the third to-be-processed data 50 according to the execution parameter to obtain the target operation result 50.

Although FIG. 7 shows an example where the first operation component includes two components, the example in FIG. 7 is only used for understanding the solution of the present disclosure. In practical implementations, the first operation component may be composed of multiple components, and the multiple components adopt operation modes of the same type. For example, the first operation component includes three comparators, or the first operation component includes five multipliers. The operation modes of the same type can use different operation functions. Although the use of the same operation function is described as an example in this embodiment, this example is not a limitation to the present disclosure. The number of components in the first operation component may be flexibly determined depending on actual situations.

For ease of understanding, this embodiment is described using an example where the intermediate operation result is a value output in one clock cycle. In practical implementations, the intermediate operation result represents an operation result outputted in one clock cycle, the operation result can be a vector, and for multiple clock cycles, a corresponding data flow will be obtained.

In the embodiments of the present disclosure, by the above method, operations of the same type can be performed by multiple operation components in the first operation component, which can reduce data processing conflicts; and in addition, multiple pieces of data can be processed simultaneously, thereby improving the operating efficiency of the processing component.

Figure 8:
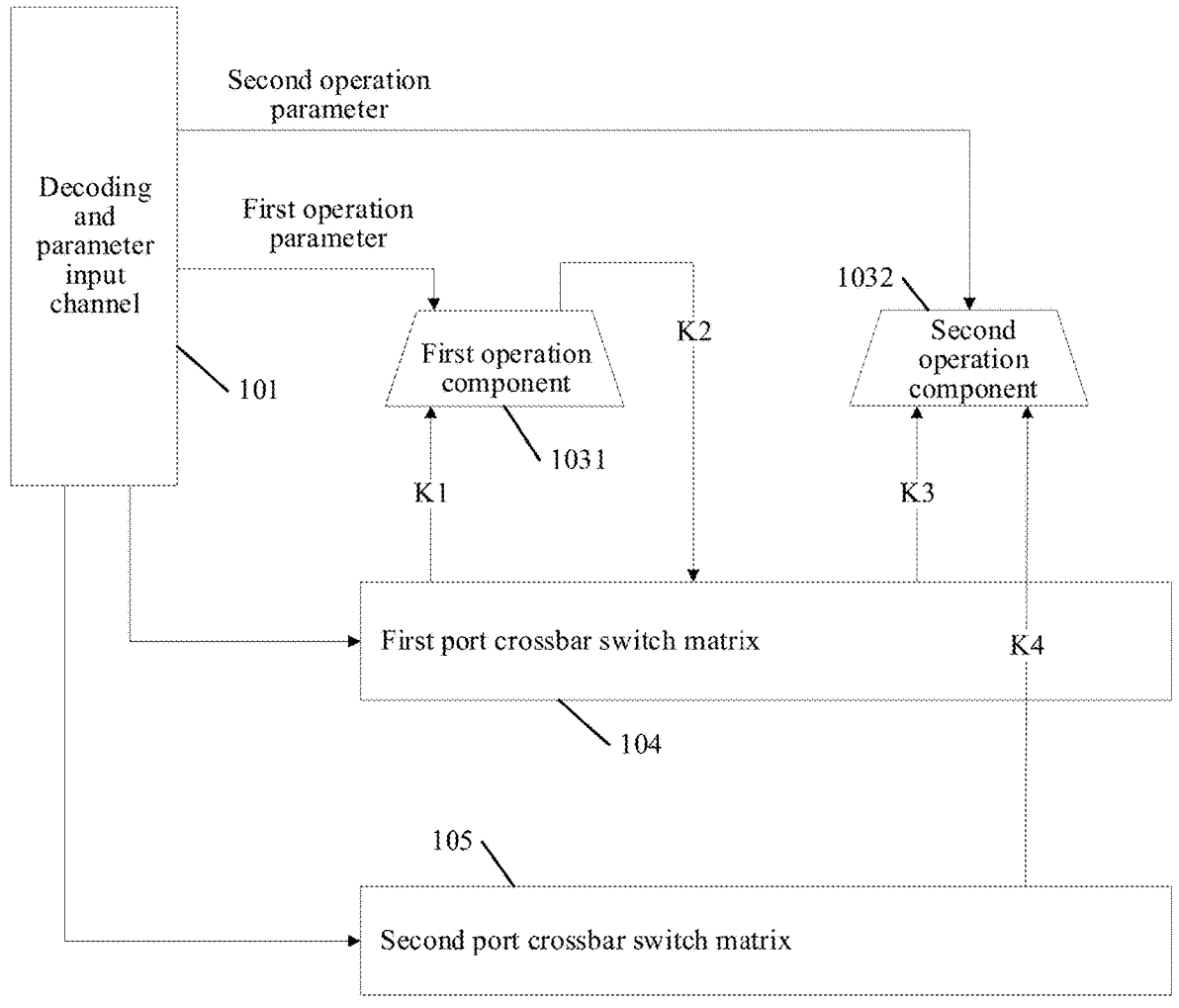
FIG. 8 is a schematic diagram of another data flow direction according to embodiment(s) of the present disclosure.

In certain embodiment(s), based on the embodiment corresponding to FIG. 2, referring to FIG. 8, in another embodiment of the processing component provided in the embodiments of the present disclosure, the operation component 103 includes at least a first operation component 1031 and a second operation component 1032.

The first port crossbar switch matrix 104 is further configured to input the first to-be-processed data to the first operation component 1031.

The second port crossbar switch matrix 105 is further configured to input the second to-be-processed data to second first operation component 1032.

The first operation component 1031 is configured to process the first to-be-processed data according to the execution parameter to obtain an intermediate operation result.

The first operation component 1031 is further configured to output the intermediate operation result to the first port crossbar switch matrix 104.

The first port crossbar switch matrix 104 is further configured to input the intermediate operation result to the second operation component 1032.

The second operation component 1032 is configured to process the intermediate operation result and the second to-be-processed data according to the execution parameter to obtain the target operation result.

In this embodiment, the operation component 103 may include at least a first operation component 1031 and a second operation component 1032, where the first operation component 1031 and the second operation component 1032 are operation components corresponding to different operation modes. For example, the first operation component 1031 is an adder, and the second operation component 1032 is a multiplier. The first port crossbar switch matrix 104 is configured to input the first to-be-processed data to the first operation component 1031. The second port crossbar switch matrix 105 is configured to input the second to-be-processed data to second first operation component 1032. The second port crossbar switch matrix 105 may not input the first to-be-processed data and the second to-be-processed data to the first operation component 1032 simultaneously, as long as the second operation component 1032 finishes the input of the second to-be-processed data before processing the intermediate operation result and the second to-be-processed data. The first operation component 1031 processes the first to-be-processed data according to the execution parameter to obtain an intermediate operation result. The first operation component 1031 outputs the intermediate operation result to the first port crossbar switch matrix 104. Then, the first port crossbar switch matrix 104 inputs the received intermediate operation result to the second operation component 1032. The second operation component 1032 can process the received intermediate operation result and second to-be-processed data according to the execution parameter to obtain a target operation result.

As shown in FIG. 8, in step K1, the first to-be-processed data can be input to the first operation component 1031 through the first port crossbar switch matrix 104. In step K2, the first operation component 1031 processes the acquired first to-be-processed data according to the execution parameter to obtain an intermediate operation result. In step K3, the first port crossbar switch matrix 104 can input the intermediate operation result to the second operation component 1032, and at the same time, in step K4, the second port crossbar switch matrix 105 can input the second to-beprocessed data to the second operation component 1032. Step K3 and step K4 are performed simultaneously. Then, the second operation component 1032 processes the intermediate operation result and the second to-be-processed data according to the execution parameter to obtain the target operation result.

The decoding and parameter input channel 101 can acquire an execution parameter, and inputs the execution parameter to the first operation component 1031, and inputs the execution parameters to the second operation component 1032.

A description is given below using an example where the operation mode corresponding to the first operation component 1031 is a table lookup operation mode, the operation mode corresponding to the second operation component 1032 is a comparison operation mode, and the second operation component 1032 adopts Max(A, B). In step K1, the first port crossbar switch matrix 104 inputs the first to-be-processed data 5 to the first operation component 1031, and the first operation component 1031 processes the first to-be-processed data 5 using a table lookup operation mode. Referring to Table 3 again, as shown in Table 3, the input data being 5 corresponds to a value of 7, so the intermediate operation result being 7 can be obtained. In step K2, the first operation component 1031 outputs the intermediate operation result 7 to the first port crossbar switch matrix 104. In step K3, the second port crossbar switch matrix 105 inputs the intermediate operation result 7 to the second first operation component 1032, and at the same time, in step K4, the second port crossbar switch matrix 105 inputs the second to-be-processed data 5 to second first operation component 1032, and then the second operation component 1032 can process the intermediate operation result 7 and the second to-be-processed data 5 through Max(A, B) to obtain the intermediate operation result 7.

Although only one first operation component and one second operation component are used as an example for illustration in FIG. 8, the example in FIG. 8 is only used for understanding the solution of the present disclosure, and in actual implementations, other operation components corresponding to different operation modes may also be included. For example, a third operation component and a fourth operation component may also be included. The number of operation components corresponding to the different arithmetic modes may be flexibly determined depending on actual situations.

In the embodiments of the present disclosure, by the method, compound operations can be performed by different operation components, which improves the operating efficiency of the processing component.

Figure 9:
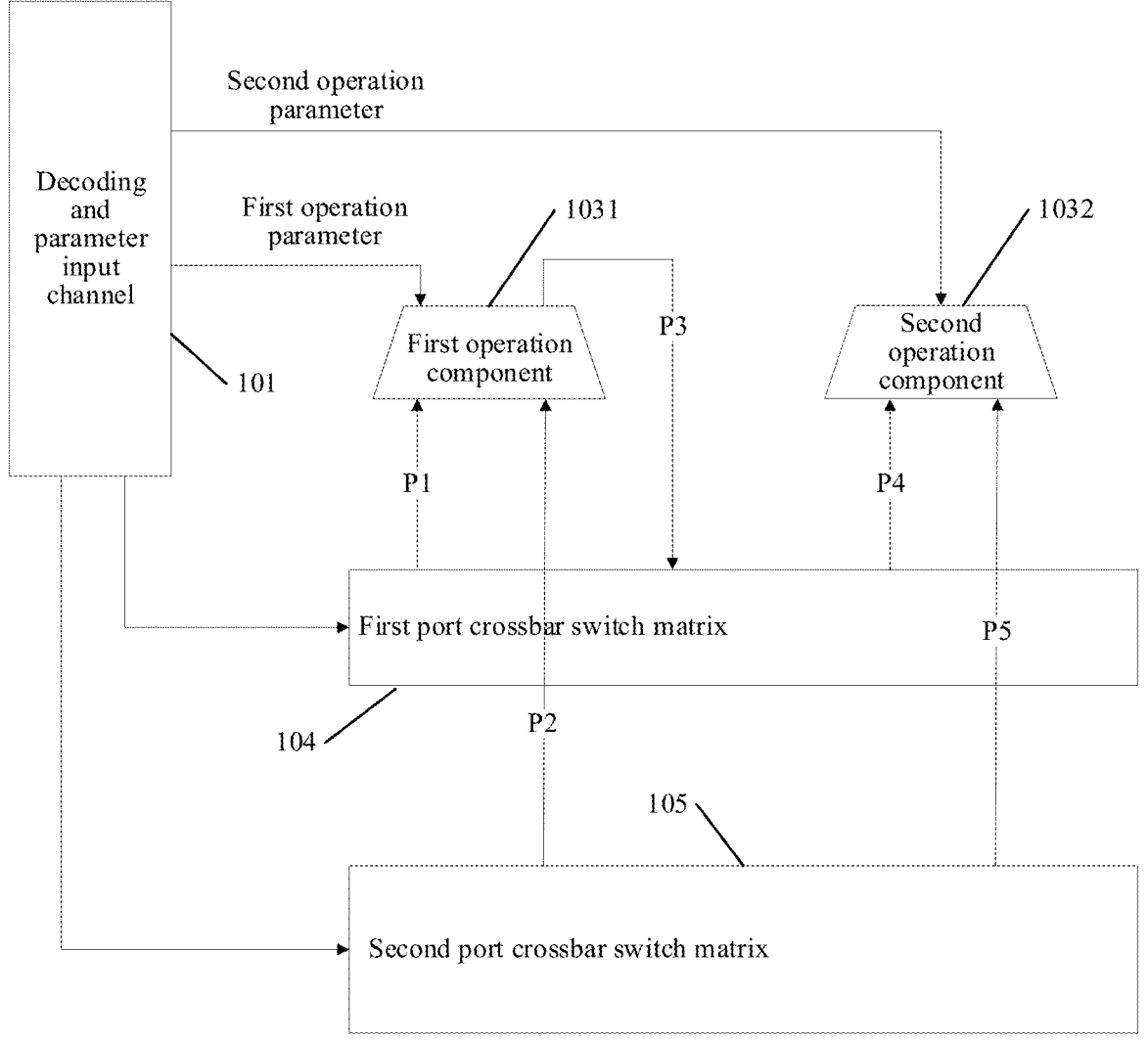
FIG. 9 is a schematic diagram of a data flow direction according to embodiment(s) of the present disclosure.

In certain embodiment(s), based on the embodiment corresponding to FIG. 2, referring to FIG. 9, in another embodiment of the processing component provided in the embodiments of the present disclosure, the operation component 103 includes at least a first operation component 1031 and a second operation component 1032.

The first port crossbar switch matrix 104 is further configured to input the first to-be-processed data to the first operation component 1031.

The second port crossbar switch matrix 105 is further configured to input the second to-be-processed data to the first operation component 1031 and the second operation component 1032.

The first operation component 1031 is configured to process the first to-be-processed data and the second to-be-processed data according to the execution parameter to obtain an intermediate operation result.

The first operation component 1031 is further configured to output the intermediate operation result to the first port crossbar switch matrix 104.

The first port crossbar switch matrix 401 is further configured to input the intermediate operation result to the second operation component 1032.

The second operation component 1032 is configured to process the intermediate operation result and the second to-be-processed data according to the execution parameter to obtain the target operation result.

In this embodiment, the operation component 103 may include at least the first operation component 1031 and the second operation component 1032. The first port crossbar switch matrix 104 can input the first to-be-processed data to the first operation component 1031, and the second port crossbar switch matrix 105 can input the second to-be-processed data to the first operation component 1031 and the second operation component 1032. The first to-be-processed data and the second to-be-processed data are input simultaneously. The first operation component 1031 can process the first to-be-processed data and the second to-be-processed data according to the execution parameter to obtain an intermediate operation result. Then the first operation component 1031 can further output the obtained intermediate operation result to the first port crossbar switch matrix 104. Then, the first port crossbar switch matrix 104 inputs the obtained intermediate operation result to the second operation component 1032. Finally, the second operation component 1032 can process the intermediate operation result and the second to-be-processed data according to the execution parameter to obtain a target operation result.

As shown in FIG. 9, in step P1, the first port crossbar switch matrix 104 inputs the first to-be-processed data to the first operation component 1031, and in step P2, the second port crossbar switch matrix 105 can input the second to-be-processed data to the first operation component 1031. Step P1 and step P2 are performed simultaneously. The decoding and parameter input channel 101 can acquire an execution parameter, and inputs the execution parameter to the first operation component 1031, and inputs the execution parameters to the second operation component 1032. The first operation component 1031 can process the first to-be-processed data and the second to-be-processed data according to the execution parameter to obtain an intermediate operation result. In step P3, the first operation component 1031 outputs the intermediate operation result to the first port crossbar switch matrix 104. In step P4, the first port crossbar switch matrix 104 inputs the intermediate operation result to the second operation component 1032, and at the same time, in step P5, the second port crossbar switch matrix 105 also inputs the second to-be-processed data to the second operation component 1032, so that the second operation component 1032 can process the intermediate operation result and the second to-be-processed data according to the obtained execution parameter to obtain the target operation result.

A description is given below using an example where the operation mode corresponding to the first operation component 1031 is a comparison operation mode using Min(A, B), and the operation mode corresponding to the second operation component 1032 is a multiplication operation mode. In step P1, the first port crossbar switch matrix 104 inputs the first to-be-processed data 10 to the first operation component 1031. In step P2, the second port crossbar switch matrix 105 inputs second to-be-processed data 15 to the first operation component 1031, and then the first operation component 1031 processes the first to-be-processed data 10 and the second to-be-processed data 15 through Min(A, B) to obtain an intermediate operation result 10. In step P3, the first operation component 1031 outputs the intermediate operation result 10 to the first port crossbar switch matrix 104. In step P4, the first port crossbar switch matrix 104 inputs the intermediate operation result 10 to the second operation component 1032, and at the same time, in step P5, the second port crossbar switch matrix 105 also inputs the second to-be-processed data 15 to the second operation component 1032, so that the second operation component 1032 can process the intermediate operation result 10 and the second to-be-processed data 15 in the multiplication operation mode to obtain the target operation result 150.

Although only one first operation component and one second operation component are used as an example for illustration in FIG. 9, the example in FIG. 9 is only used for understanding the solution of the present disclosure, and in actual implementations, other operation components corresponding to different operation modes may also be included. For example, a third operation component and a fourth operation component may also be included. The number of operation components corresponding to the different arithmetic modes may be flexibly determined depending on actual situations.

For ease of understanding, this embodiment is described using an example where the intermediate operation result is a value output in one clock cycle. In practical implementations, the intermediate operation result represents an operation result outputted in one clock cycle, the operation result can be a vector, and for multiple clock cycles, a corresponding data flow will be obtained.

In the embodiments of the present disclosure, by the method, the operation based on the data flow ensures that data is effectively passed to the execution component in each clock cycle without additional waiting overheads. Therefore, in the running process, when the overheads of data import and export are not considered, each component can reach a 100% execution efficiency, which can further improve the execution efficiency of the processing component for compound operations.

Figure 10:
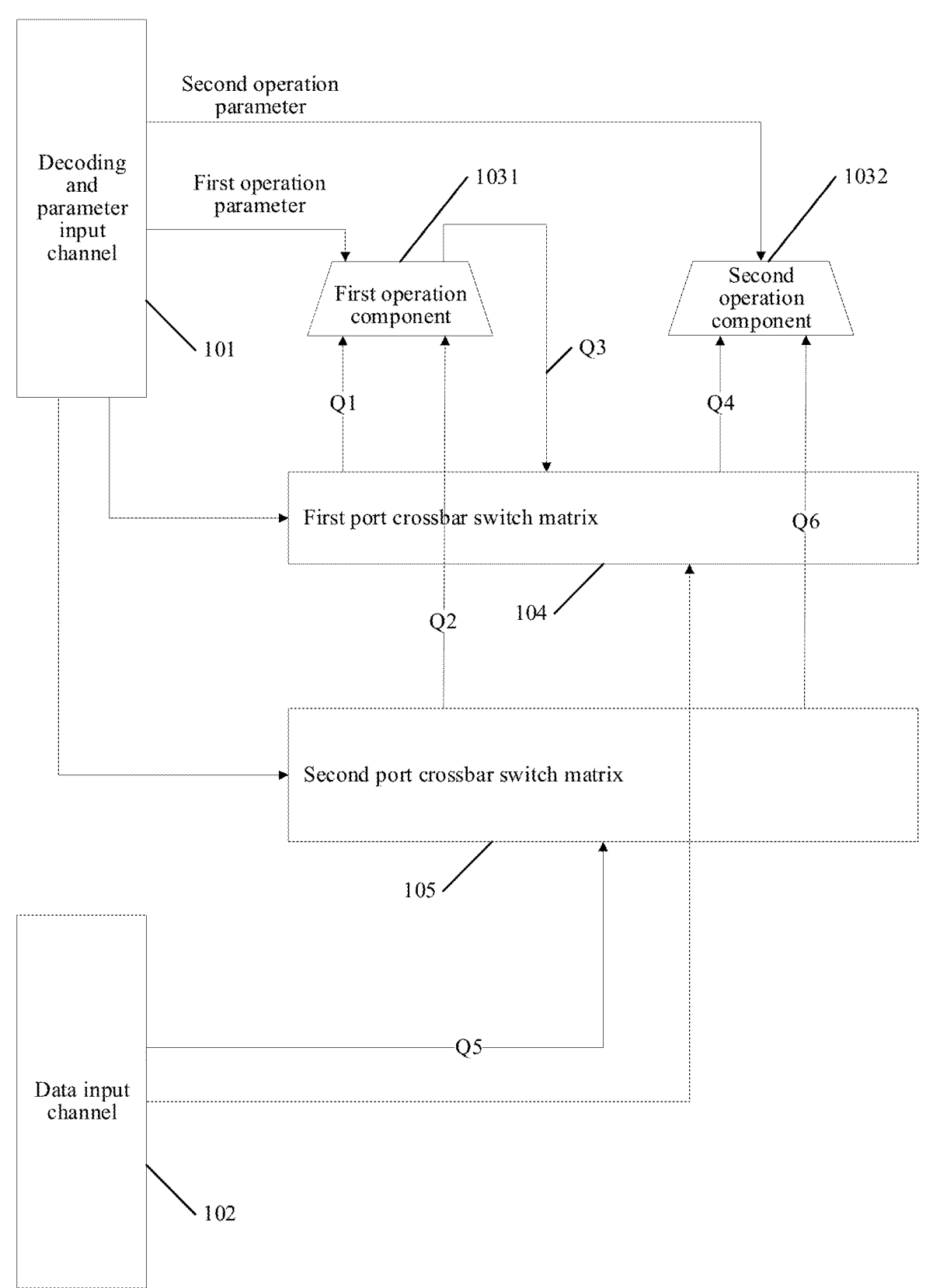
FIG. 10 is a schematic diagram of a data flow direction according to embodiment(s) of the present disclosure.

In certain embodiment(s), based on the embodiment corresponding to FIG. 2, referring to FIG. 10, in another embodiment of the processing component provided in the embodiments of the present disclosure, the operation component 103 includes at least a first operation component 1031 and a second operation component 1032.

The data input channel 102 is further configured to receive third to-be-processed data.

The first port crossbar switch matrix 104 is further configured to input the first to-be-processed data to the first operation component 1031.

The second port crossbar switch matrix 105 is further configured to input the second to-be-processed data to the first operation component 1031 and input the third to-be-processed data to the second operation component 1032.

The first operation component 1031 is configured to process the first to-be-processed data and the second to-be-processed data according to the execution parameter to obtain an intermediate operation result.

The first operation component 1031 is further configured to output the intermediate operation result to the first port crossbar switch matrix 104.

The first port crossbar switch matrix 104 is further configured to input the intermediate operation result to the second operation component 1032.

The second operation component 1032 is configured to process the intermediate operation result and the third to-beprocessed data according to the execution parameter to obtain the target operation result.

In this embodiment, the operation component 103 may include at least the first operation component 1031 and the second operation component 1032, and the data input channel 102 may also receive third to-be-processed data. The first port crossbar switch matrix 104 can input the first to-be-processed data to the first operation component 1031, the second port crossbar switch matrix 105 can input the second to-be-processed data to the first operation component 1031, and then the first operation component 1031 processes the first to-be-processed data and the second to-be-processed data according to the execution parameter to obtain an intermediate operation result. The first operation component 1031 can also output the intermediate operation result to the first port crossbar switch matrix 104, the first port crossbar switch matrix 104 inputs the intermediate operation result to the second operation component 1032, and the second port crossbar switch matrix 105 inputs the third to-be-processed data to the second operation component 1032. The second operation component 1032 processes the intermediate operation result and the third to-be-processed data according to the execution parameter to obtain the target operation result.

As shown in FIG. 10, the data input channel 102 receives the third to-be-processed data, and inputs the third to-be-processed data to the second port crossbar switch matrix 105. In step Q1, the first port crossbar switch matrix 104 can input the first to-be-processed data to the first operation component 1031, and in step Q2, the second port crossbar switch matrix 105 can input the second to-be-processed data to the first operation component 1031. The decoding and parameter input channel 101 can acquire an execution parameter, and inputs the execution parameter to the first operation component 1031, and inputs the execution parameters to the second operation component 1032. In step Q3, the first operation component 1031 can process the first to-be-processed data and the second to-be-processed data according to the execution parameter to obtain an intermediate operation result, and then the first operation component 1031 outputs the intermediate operation result to the first port crossbar switch matrix 104. In step Q4, the first port crossbar switch matrix 104 inputs the intermediate operation result to the second operation component 1032. In step Q5, the data input channel 102 receives the third to-be-processed data and sends the third to-be-processed data to the second port crossbar switch matrix 105. Then in step Q6, the second port crossbar switch matrix 105 inputs the third to-be-processed data to the second operation component 1032, and the second operation component 1032 processes the intermediate operation result and the third to-be-processed data according to the execution parameter obtained above to obtain the target operation result.

A description is given below using an example where the operation mode corresponding to the first operation component 1031 is a multiplication operation mode and the operation mode corresponding to the second operation component 1032 is an addition operation mode Add(A, B). In step Q1, the first port crossbar switch matrix 104 inputs the first to-be-processed data 8 to the first operation component 1031. In step Q2, the second port crossbar switch matrix 105 inputs the second to-be-processed data 5 to the first operation component 1031, and then the first operation component 1031 processes the first to-be-processed data 8 and the second to-be-processed data 5 in the multiplication operation mode to obtain an intermediate operation result 40. In step Q3, the first operation component 1031 outputs the intermediate operation result 40 to the first port crossbar switch matrix 104. In step Q4, the first port crossbar switch matrix 104 inputs the intermediate operation result 40 to the second operation component 1032. Therefore, the second operation component 1032 can add the intermediate operation result 40 and third to-be-processed data 60 through Add(A, B) to obtain a target operation result 100.

Although only one first operation component and one second operation component are used as an example for illustration in FIG. 10, the example in FIG. 10 is only used for understanding the solution of the present disclosure, and in actual implementations, other operation components corresponding to different operation modes may also be included. For example, a third operation component and a fourth operation component may also be included. The number of operation components corresponding to the different arithmetic modes may be flexibly determined depending on actual situations.

For ease of understanding, this embodiment is described using an example where the intermediate operation result is a value output in one clock cycle. In practical implementations, the intermediate operation result represents an operation result outputted in one clock cycle, the operation result can be a vector, and for multiple clock cycles, a corresponding data flow will be obtained.

In the embodiments of the present disclosure, by the method, multiple compound operations can be performed by different operation components, which improves the operating efficiency of the processing component. In addition, the different operation components perform operations in sequence, which also reduces data processing conflicts.

In certain embodiment(s), based on the embodiment corresponding to FIG. 2, in another embodiment of the processing component provided in the embodiments of the present disclosure, the operation component includes at least one of a comparator, an adder, a multiplier, and a lookup table.

The comparator is configured to perform a numerical comparison operation on at least one to-be-processed data.

The adder is configured to perform a numerical summation operation on at least one to-be-processed data.

The multiplier is configured to perform a numerical multiplication operation on two pieces of to-be-processed data.

The lookup table is configured to perform a table lookup operation according to to-be-processed data, or perform a linear interpolation operation and a table lookup operation according to to-be-processed data.

In this embodiment, the operation component may also include at least one of a comparator, an adder, a multiplier, and a lookup table. The functions of the comparator, the adder, the multiplier, and the lookup table have been introduced in the above embodiments, and will not be repeated here.

For ease of understanding, it is assumed that the input to-be-processed data is 5 and 7. If the comparator uses Max(A, B) in the comparison operation mode, the to-be-processed data 5 and the to-be-processed data 7 can be compared, and the maximum of the two pieces of to-be-processed data is used as an output, that is, the comparator can output 7. If Min(A, B) in the comparison operation mode is used, the to-be-processed data 5 and the to-be-processed data 7 can be compared, and the minimum of the two pieces of to-be-processed data is used as an output, that is, the comparator can output 5. In certain embodiment(s), if the adder adopts Add(A, B) in the addition operation mode, the to-be-processed data 5 and the to-be-processed data 7 can be numerically summed, that is, the adder can output 12. In certain embodiment(s), if the multiplier adopts the multiplication operation mode, the to-be-processed data 5 and the data 7 to be processed can be numerically multiplied, that is, the multiplier can output 35. In certain embodiment(s), since the lookup table can be implemented by table lookup and linear interpolation, referring to Table 3 again, it can be seen from Table 3 that output data corresponding to the input to-be-processed data 5 is 7 and output data corresponding to the input to-be-processed data 7 is 8, that is, the lookup table can output 7 and 8.

In the embodiments of the present disclosure, by the above method, the operation component can implement computing operations in different operation modes according to different devices, which improves the efficiency and accuracy of different operations, thereby improving the operating efficiency and accuracy of the processing component.

In certain embodiment(s), based on the embodiment corresponding to FIG. 2, in another embodiment of the processing component provided in the embodiments of the present disclosure, the ALU further includes a precision conversion module.

The data input channel 102 is further configured to input the first to-be-processed data and the second to-be-processed data to the precision conversion module, wherein the first to-be-processed data corresponds to a first data format, and the second to-be-processed data corresponds to a second data format.

The precision conversion module is configured to convert the first to-be-processed data from the first data format to a third data format, and output the converted first to-be-processed data.

The precision conversion module is further configured to convert the second to-be-processed data from the second data format into a fourth data format, and output the converted second to-be-processed data, where the fourth data format and the second data format are different data formats.

The operation component 103 is further configured to input the target operation result into the first port crossbar switch matrix 104, wherein the target operation result corresponds to a fifth data format.

The first port crossbar switch matrix 104 is further configured to input the target operation result to the second precision conversion module.

The precision conversion module is further configured to convert the target operation result from the fifth data format to a sixth data format, and output the converted target operation result.

In this embodiment, the ALU may further include a precision conversion module. For ease of understanding, referring to FIG. 1. The precision conversion module may include two modules, namely, a precision conversion module A and a precision conversion module B. The data input channel 102 inputs first to-be-processed data and second to-be-processed data to the precision conversion module A, where the first to-be-processed data corresponds to a first data format, and the second to-be-processed data corresponds to a second data format. Then the precision conversion module can convert the first to-be-processed data from the first data format to a third data format, and output the converted first to-be-processed data, where the third data format and the first data format are different data formats. The precision conversion module A converts the second to-be-processed data from the second data format into a fourth data format, and outputs the converted second to-be-processed data, where the fourth data format and the second data format are different data formats. Further, the operation component 103 can input the target operation result into the first port crossbar switch matrix 104, wherein the target operation result corresponds to a fifth data format. The corresponding data format is not changed when the data passes through the first port crossbar switch matrix, the second port crossbar switch matrix, and the operation component. The first port crossbar switch matrix 104 inputs the target operation result to the precision conversion module B, and finally the precision conversion module B can convert the target operation result from the fifth data format to a sixth data format, and output the converted target operation result, where the sixth data format and the fifth data format are different data formats.

In certain embodiment(s), the precision conversion module can convert a standard input precision into a precision desirable for calculations inside the ALU. The accuracy desirable for calculations inside the ALU is more accurate than the input precision, and indicates a larger range of values. For example, the external precision is FP16, and the precision desirable for calculations inside the ALU can be FP32, FP64, integer (int) 48 or other different formats, to achieve higher precision. The first data format and the second data format can be the same data format or different data formats. For example, the first data format can be int8 or half-precision floating-point (fp16), and the second data format can be int8, fp16 or other data formats. The third data format and the fourth data format can be the same data format or different data formats, and the data precisions of the third data format and the fourth data format are both greater than those of the first data format and the second data format. For example, if the first data format is int8, the precision conversion module can convert the first to-be-processed data into the third data format int32. For another example, if the second data format is fp16, the precision conversion module can convert the second to-be-processed data into the fourth data format. fp32. The fourth data format and the fifth data format are usually the same data format, and the fourth data format and the sixth data format can be the same data format or different data formats. For example, if the fourth data format is fp32, the fifth data format can be fp32, and the precision conversion module can convert the target operation result into the sixth data format fp16.

In the embodiments of the present disclosure, by the method, when the precision of the input data is converted, the precision is improved so that the data precision provides a more accurate expression and indicates a larger value range, thereby improving the operation precision; and when the precision of the target operation result is converted, the precision is reduced so that the output data occupies fewer transmission resources and the consumption of data transmission is reduced, thereby improving the operation precision of the processing component, and reducing the consumption of data transmission in the processing component.

Based on the above description, the present disclosure proposes a data processing method. The data processing method in the present disclosure will be described below. The method is applicable to a processing component. The processing component includes at least one ALU. The ALU includes a decoding and parameter input channel, a data input channel, an operation component, a first port crossbar switch matrix, and a second port crossbar switch matrix. Referring to FIG. 11, FIG. 11 is a schematic diagram of an embodiment of the data processing method according to the embodiments of the present disclosure. As shown in the figure, an embodiment of the data processing method in the embodiments of the present disclosure includes:

101: Receive an execution parameter by the decoding and parameter input channel, the execution parameter being obtained by parsing a configuration instruction.

In this embodiment, a data processing apparatus can receive an execution parameter through the decoding and parameter input channel, the execution parameter being obtained by parsing a very long instruction word (VLIW). In certain embodiment(s), the very long instruction word can include a table lookup processing instruction, an addition processing instruction, a multiplication processing instruction, and a comparison processing instruction. Each processing instruction carries a corresponding operation parameter, and the decoding and parameter input channel can pass the operation parameter to the corresponding operation component. For example, the table lookup processing instruction can carry a table lookup operation parameter, the addition processing instruction can carry an addition operation parameter, the multiplication processing instruction can carry a multiplication operation parameter, and the comparison processing instruction can carry a comparison operation parameter. In practical implementations, very long instruction word may also include other instructions and carry operation parameters corresponding to the other instructions, which will not be exhaustively listed here.

The data processing apparatus can be deployed in a processor or a chip, which is not limited here.

102: Receive first to-be-processed data and second to-be-processed data by the data input channel.

In this embodiment, the data processing apparatus can further receive first to-be-processed data and second to-be-processed data through the data input channel. In certain embodiment(s), the first to-be-processed data may be tensor data, and the second to-be-processed data may be tensor data or scalar data. The tensor data can come from an on-chip buffer, and the scalar data can come from an instruction parameter. In addition, the precision of the above data can include but is not limited to FP64, FP32, and FP16.

103: Input the first to-be-processed data to the operation component by the first port crossbar switch matrix.

In this embodiment, after the first to-be-processed data is input to the first port crossbar switch matrix through the data input channel, the data processing apparatus may input the first to-be-processed data to the operation component through the first port crossbar switch matrix.

104: Input the second to-be-processed data to the operation component by the second port crossbar switch matrix.

In this embodiment, after the second to-be-processed data is input to the second port crossbar switch matrix through the data input channel, the data processing device can input the second to-be-processed data to the operation component through the second port crossbar switch matrix. Step 203 and step 204 are performed simultaneously.

105: Process the first to-be-processed data and the second to-be-processed data according to the execution parameter in the configuration instruction to obtain a target operation result by the operation component.

In this embodiment, the first to-be-processed data and the second to-be-processed data obtained in step 203 and step 204 can be processed according to the execution parameter, so as to obtain the target operation result.

For the functions of the processing component involved in step 201 to step 205, reference can be made to the embodiments, and the details will not be repeated here.

In certain embodiment(s), the execution parameter carries an operation mode identifier; the data processing method further includes: receiving a data write address by the data input channel; the inputting the first to-be-processed data to the operation component by the first port crossbar switch matrix includes: reading the first to-be-processed data from the data input channel corresponding to a first read address according to the execution parameter by the first port crossbar switch matrix; the inputting the second to-be-processed data to the operation component by the second port crossbar switch matrix includes: reading the second to-be-processed data from the data input channel corresponding to a second read address according to the execution parameter by the second port crossbar switch matrix; and the processing the first to-be-processed data and the second to-be-processed data according to the execution parameter in the very long instruction word to obtain a target operation result by the operation component includes: processing data using an operation mode corresponding to the operation mode identifier according to the execution parameter to obtain an intermediate operation result by the operation component; processing the intermediate operation result to obtain the target operation result by the operation component; inputting the target operation result into the first port crossbar switch matrix by the operation component; and outputting the target operation result according to the data write address by the first port crossbar switch matrix.

In certain embodiment(s), the data processing method further includes: receiving a control signal and a window identifier by the data input channel, wherein the control signal includes at least one of a feature map end flag or a data valid flag, wherein the feature map end flag represents a last piece of data in a feature map, and the data valid flag represents enabling the ALU; and the window identifier includes at least one of a window start identifier and a window end identifier, wherein the window start identifier represents a first piece of data in a window, and the window end identifier represents a last piece of data in a window.

In certain embodiment(s), the data input channel includes at least a tensor input channel, a scalar input channel, and an address input channel; at least one of the first to-be-processed data or the second to-be-processed data is received by the tensor input channel, wherein the first to-be-processed data and the second to-be-processed data are both data included in a tensor; the second to-be-processed data is received by the scalar input channel, wherein the second to-be-processed data is data corresponding to a scalar; and a result output address is received by the address input channel, wherein the result output address is an address written into a memory.

In certain embodiment(s), the second port crossbar switch matrix includes a delay adjuster; the inputting the first to-be-processed data to the operation component by the first port crossbar switch matrix includes: inputting the first to-be-processed data to the operation component in a first clock cycle by the first port crossbar switch matrix; and the processing the first to-be-processed data and the second to-be-processed data according to the execution parameter to obtain a target operation result by the operation component includes: outputting an intermediate operation result to the first port crossbar switch matrix in a second clock cycle by the operation component, wherein the intermediate operation result is obtained from an operation performed according to the first to-be-processed data, and the second clock cycle and the first clock cycle are spaced by M clock cycles, wherein M is an integer greater than or equal to 1; inputting the intermediate operation result to the operation component in a third clock cycle by the first port crossbar switch matrix, wherein the third clock cycle and the first clock cycle are spaced by N clock cycles, wherein N is an integer greater than or equal to M; and inputting the second to-be-processed data to the operation component in the third clock cycle by the delay adjuster;

In certain embodiment(s), the operation component includes at least a first operation component; the inputting the first to-be-processed data to the operation component by the first port crossbar switch matrix includes: inputting the first to-be-processed data to the first operation component by the first port crossbar switch matrix; and the inputting the second to-be-processed data to the operation component by the second port crossbar switch matrix includes: inputting the second to-be-processed data to the first operation component by the second port crossbar switch matrix; processing the first to-be-processed data according to the execution parameter to obtain an intermediate operation result by the first operation component; outputting the intermediate operation result to the first port crossbar switch matrix by the first operation component; inputting the intermediate operation result to the first operation component by the first port crossbar switch matrix; and processing the intermediate operation result and the second to-be-processed data according to the execution parameter to obtain a target operation result by the first operation component.

In certain embodiment(s), the operation component includes at least a first operation component; the inputting the first to-be-processed data to the operation component by the first port crossbar switch matrix includes: inputting the first to-be-processed data to the first operation component by the first port crossbar switch matrix; and the inputting the second to-be-processed data to the operation component by the second port crossbar switch matrix includes: inputting the second to-be-processed data to the first operation component by the second port crossbar switch matrix; processing the first to-be-processed data and the second to-be-processed data according to the execution parameter in the configuration instruction to obtain an intermediate operation result by the first operation component; outputting the intermediate operation result to the first port crossbar switch matrix by the first operation component; inputting the intermediate operation result to the first operation component by the first port crossbar switch matrix; and processing the intermediate operation result and the second to-be-processed data according to the execution parameter to obtain a target operation result by the first operation component.

In certain embodiment(s), the operation component includes at least a first operation component; the data processing method further includes: receiving third to-be-processed data by the data input channel; the inputting the first to-be-processed data to the operation component by the first port crossbar switch matrix includes: inputting the first to-be-processed data to the first operation component by the first port crossbar switch matrix; and the inputting the second to-be-processed data to the operation component by the second port crossbar switch matrix includes: inputting the second to-be-processed data and the third to-be-processed data to the first operation component by the second port crossbar switch matrix; processing the first to-be-processed data and the second to-be-processed data according to the execution parameter in the configuration instruction to obtain an intermediate operation result by the first operation component; outputting the intermediate operation result to the first port crossbar switch matrix by the first operation component; inputting the intermediate operation result to the first operation component by the first port crossbar switch matrix; and processing the intermediate operation result and the third to-be-processed data according to the execution parameter to obtain a target operation result by the first operation component.

In certain embodiment(s), the operation component includes at least a first operation component and a second operation component; the inputting the first to-be-processed data to the operation component by the first port crossbar switch matrix includes: inputting the first to-be-processed data to the first operation component by the first port crossbar switch matrix; and the inputting the second to-be-processed data to the operation component by the second port crossbar switch matrix includes: inputting the second to-be-processed data to the second operation component by the second port crossbar switch matrix; processing the first to-be-processed data according to the execution parameter to obtain an intermediate operation result by the first operation component; outputting the intermediate operation result to the first port crossbar switch matrix by the first operation component; inputting the intermediate operation result to the second operation component by the first port crossbar switch matrix; and processing the intermediate operation result and the second to-be-processed data according to the execution parameter to obtain a target operation result by the second operation component.

In certain embodiment(s), the operation component includes at least a first operation component and a second operation component; the inputting the first to-be-processed data to the operation component by the first port crossbar switch matrix includes: inputting the first to-be-processed data to the first operation component by the first port crossbar switch matrix; and the inputting the second to-be-processed data to the operation component by the second port crossbar switch matrix includes: inputting the second to-be-processed data to the first operation component and the second operation component by the second port crossbar switch matrix; processing the first to-be-processed data and the second to-be-processed data according to the execution parameter in the configuration instruction to obtain an intermediate operation result by the first operation component; outputting the intermediate operation result to the first port crossbar switch matrix by the first operation component; inputting the intermediate operation result to the second operation component by the first port crossbar switch matrix; and processing the intermediate operation result and the second to-be-processed data according to the execution parameter to obtain a target operation result by the second operation component.

In certain embodiment(s), the operation component includes at least a first operation component and a second operation component; and the data processing method further includes: receiving third to-be-processed data by the data input channel; inputting the first to-be-processed data to the first operation component by the first port crossbar switch matrix; and inputting the second to-be-processed data to the first operation component and inputting the third to-be-processed data to the second operation component by the second port crossbar switch matrix; processing the first to-be-processed data and the second to-be-processed data according to the execution parameter in the configuration instruction to obtain an intermediate operation result by the first operation component; outputting the intermediate operation result to the first port crossbar switch matrix by the first operation component; inputting the intermediate operation result to the second operation component by the first port crossbar switch matrix; and processing the intermediate operation result and the third to-be-processed data according to the execution parameter to obtain a target operation result by the second operation component.

In certain embodiment(s), the operation component includes at least one of a comparator, an adder, a multiplier, and a lookup table; the comparator is configured to perform a numerical comparison operation on at least one to-be-processed data; the adder is configured to perform a numerical summation operation on at least one to-be-processed data; the multiplier is configured to perform a numerical multiplication operation on two pieces of to-be-processed data; and the lookup table is configured to perform a table lookup operation according to to-be-processed data, or perform a linear interpolation operation and a table lookup operation according to to-be-processed data.

In certain embodiment(s), the ALU further includes a precision conversion module, and the data processing method further includes: inputting the first to-be-processed data and the second to-be-processed data to the precision conversion module by the data input channel, wherein the first to-be-processed data corresponds to a first data format, and the second to-be-processed data corresponds to a second data format; converting the first to-be-processed data from the first data format to a third data format, and outputting the converted first to-be-processed data by the precision conversion module; converting the second to-be-processed data from the second data format into a fourth data format, and outputting the converted second to-be-processed data by the precision conversion module, where the fourth data format and the second data format are different data formats; inputting the target operation result into the first port crossbar switch matrix by the operation component, wherein the target operation result corresponds to a fifth data format; inputting the target operation result to the second precision conversion module by the first port crossbar switch matrix; and converting the target operation result from the fifth data format to a sixth data format, and outputting the converted target operation result by the precision conversion module.

In the embodiments of the present disclosure, a data processing method is provided. By the above method, the first port crossbar switch matrix and the second port crossbar switch matrix can control the input of data so that the data flows to the operation component, and the data can be processed multiple times in one operation cycle based on the execution parameter, and finally output the operation result, thereby improving the data processing efficiency.

In addition, the embodiments of the present disclosure further provide a storage medium, the storage medium being configured to store a computer program, the computer program being configured to execute the method in the embodiments.

The embodiments of the present disclosure further provide a computer program product including instructions, the instructions, when run on a computer, causing the computer to execute the method according to the embodiments.

Persons skilled in the art can clearly understand that for convenience and conciseness of description, for specific working processes of the described system, apparatus and unit, reference may be made to the corresponding processes in the method embodiments, and details are not described herein.

In the several embodiments provided in the present disclosure, the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of the present disclosure may be integrated into one processing component, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of the present disclosure essentially, or the part, or all or a part of the technical solutions may be implemented in the form of a software product. The computer software product is stored in a storage medium and includes several instructions for instructing a computing device (which may be a PC, a server or a network device) to perform all or some of the steps of the method described in the embodiments of the present disclosure. The storage medium includes: any medium that can store program code, such as a USB flash drive, a removable hard disk, a read-only memory (read-only memory, ROM), a random access memory (random access memory, RAM), a magnetic disk, or an optical disc.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments are merely intended for describing the technical solutions of the present disclosure, but not for limiting the present disclosure. It is to be understood by a person of ordinary skill in the art that although the present disclosure has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the spirit and scope of the technical solutions of the embodiments of the present disclosure.

What is claimed is:

1. A processing component, comprising: at least one arithmetic and logic unit (ALU), the ALU comprising:
    a decoding and parameter input channel configured to receive an execution parameter, the execution parameter being obtained by parsing a configuration instruction;

a data input channel configured to receive first data and second data;

a first port crossbar switch matrix configured to input the first data to the operation component;

a second port crossbar switch matrix configured to input the second data to the operation component; and an operation component configured to process the first data and the second data according to the execution parameter to obtain a target operation result, wherein the operation component comprises at least one of:

a comparator configured to perform a numerical comparison operation on at least one piece of data;

an adder configured to perform a numerical summation operation on at least one piece of data;

a multiplier configured to perform a numerical multiplication operation on two pieces of data; or a lookup table configured to perform a table lookup operation according to one piece of data, or perform a linear interpolation operation and a table lookup operation according to one or more pieces of data.

2. The processing component according to claim 1, wherein the execution parameter carries an operation mode identifier;

the data input channel is further configured to receive a data write address;

the first port crossbar switch matrix is further configured to read the first data from the data input channel corresponding to a first read address;

the second port crossbar switch matrix is further configured to read the second data from the data input channel corresponding to a second read address;

the operation component is further configured to process data using an operation mode corresponding to the operation mode identifier according to the execution parameter to obtain an intermediate operation result;

process the intermediate operation result to obtain the target operation result; and input the target operation result into the first port crossbar switch matrix; and the first port crossbar switch matrix is further configured to output the target operation result according to the data write address.

3. The processing component according to claim 1, wherein the data input channel is further configured to receive a control signal and a window identifier, wherein the control signal includes at least one of a feature map end flag or a data valid flag, wherein the feature map end flag represents a last piece of data in a feature map, and the data valid flag represents enabling the ALU; and the window identifier includes at least one of a window start identifier and a window end identifier, wherein the window start identifier represents a first piece of data in a window, and the window end identifier represents a last piece of data in a window.

4. The processing component according to claim 1, wherein the data input channel includes at least a tensor input channel, a scalar input channel, and an address input channel;

the tensor input channel is configured to receive at least one of the first data or the second data, wherein the first data and the second data are both data included in a tensor;

the scalar input channel is configured to receive the second data, wherein the second data is data corresponding to a scalar; and the address input channel is configured to receive a result output address, wherein the result output address is an address written into a memory.

5. The processing component according to claim 1, wherein the second port crossbar switch matrix includes a delay adjuster;

the first port crossbar switch matrix is further configured to input the first data to the operation component in a first clock cycle;

the operation component is further configured to output an intermediate operation result to the first port crossbar switch matrix in a second clock cycle, wherein the intermediate operation result is obtained from an operation performed according to the first data, and the second clock cycle and the first clock cycle are spaced by M clock cycles, wherein Mis an integer greater than or equal to 1;

the first port crossbar switch matrix is further configured to input the intermediate operation result to the operation component in a third clock cycle, wherein the third clock cycle and the first clock cycle are spaced by N clock cycles, wherein N is an integer greater than or equal to M;

the delay adjuster is configured to input the second data to the operation component in the third clock cycle.

6. The processing component according to claim 1, wherein the operation component includes at least a first operation component;

the first port crossbar switch matrix is further configured to input the first data to the first operation component;

the second port crossbar switch matrix is further configured to input the second data to the first operation component;

the first operation component is configured to process the first data according to the execution parameter to obtain an intermediate operation result;

the first operation component is further configured to output the intermediate operation result to the first port crossbar switch matrix;

the first port crossbar switch matrix is further configured to input the intermediate operation result to the first operation component; and the first operation component is further configured to process the intermediate operation result and the second data according to the execution parameter to obtain the target operation result.

7. The processing component according to claim 1, wherein the operation component includes at least a first operation component;

the first port crossbar switch matrix is further configured to input the first data to the first operation component;

the second port crossbar switch matrix is further configured to input the second data to the first operation component;

the first operation component is configured to process the first data and the second data according to the execution parameter to obtain an intermediate operation result;

the first operation component is further configured to output the intermediate operation result to the first port crossbar switch matrix;

the first port crossbar switch matrix is further configured to input the intermediate operation result to the first operation component; and the first operation component is further configured to process the intermediate operation result and the second data according to the execution parameter to obtain the target operation result.

8. The processing component according to claim 1, wherein the operation component includes at least a first operation component;

the data input channel is further configured to receive third data;

the first port crossbar switch matrix is further configured to input the first data to the first operation component;

the second port crossbar switch matrix is further configured to input the second data and the third data to the first operation component;

the first operation component is configured to process the first data and the second data according to the execution parameter to obtain an intermediate operation result;

the first operation component is further configured to output the intermediate operation result to the first port crossbar switch matrix;

the first port crossbar switch matrix is further configured to input the intermediate operation result to the first operation component; and the first operation component is further configured to process the intermediate operation result and the third data according to the execution parameter to obtain the target operation result.

9. The processing component according to claim 1, wherein the operation component includes at least a first operation component and a second operation component;

the first port crossbar switch matrix is further configured to input the first data to the first operation component;

the second port crossbar switch matrix is further configured to input the second data to the second operation component;

the first operation component is configured to process the first data according to the execution parameter to obtain an intermediate operation result;

the first operation component is further configured to output the intermediate operation result to the first port crossbar switch matrix;

the first port crossbar switch matrix is further configured to input the intermediate operation result to the second operation component; and the second operation component is configured to process the intermediate operation result and the second data according to the execution parameter to obtain the target operation result.

10. The processing component according to claim 1, wherein the operation component includes at least a first operation component and a second operation component;

the first port crossbar switch matrix is further configured to input the first data to the first operation component;

the second port crossbar switch matrix is further configured to input the second data to the first operation component and the second operation component;

the first operation component is configured to process the first data and the second data according to the execution parameter to obtain an intermediate operation result;

the first operation component is further configured to output the intermediate operation result to the first port crossbar switch matrix;

the first port crossbar switch matrix is further configured to input the intermediate operation result to the second operation component; and the second operation component is configured to process the intermediate operation result and the second data according to the execution parameter to obtain the target operation result.

11. The processing component according to claim 1, wherein the operation component includes at least a first operation component and a second operation component;

the data input channel is further configured to receive third data;

the first port crossbar switch matrix is further configured to input the first data to the first operation component;

the second port crossbar switch matrix is further configured to input the second data to the first operation component and input the third data to the second operation component;

the first operation component is configured to process the first data and the second data according to the execution parameter to obtain an intermediate operation result;

the first operation component is further configured to output the intermediate operation result to the first port crossbar switch matrix;

the first port crossbar switch matrix is further configured to input the intermediate operation result to the second operation component; and the second operation component is configured to process the intermediate operation result and the third data according to the execution parameter to obtain the target operation result.

12. The processing component according to claim 1, wherein the ALU further includes a precision conversion module;

the data input channel is further configured to input the first data and the second data to the precision conversion module, wherein the first to-be-processed data corresponds to a first data format, and the second data corresponds to a second data format;

the precision conversion module is configured to convert the first data from the first data format to a third data format, and output the converted first data;

the precision conversion module is further configured to convert the second data from the second data format into a fourth data format, and output the converted second data;

the operation component is further configured to input the target operation result into the first port crossbar switch matrix, wherein the target operation result corresponds to a fifth data format;

the first port crossbar switch matrix is further configured to input the target operation result to the second precision conversion module; and the precision conversion module is further configured to convert the target operation result from the fifth data format to a sixth data format, and output the converted target operation result.

13. The processing component according to claim 1, wherein the at least one ALU in the processing component further includes a parallel ALU associated with the ALU;

the parallel ALU is configured to generate a parallel operation result according to the execution parameter;

the parallel ALU is further configured to output the parallel operation result in a target clock cycle; and the ALU is configured to output the target operation result in the target clock cycle.

14. A data processing method, applied to a processing component, the processing component including at least one arithmetic and logic unit (ALU), the ALU including a decoding and parameter input channel, a data input channel, an operation component, a first port crossbar switch matrix, and a second port crossbar switch matrix, the method comprising:

receiving, by the decoding and parameter input channel, an execution parameter, the execution parameter being obtained by parsing a configuration instruction;

receiving, by the data input channel, first data and second data;

inputting, by the first port crossbar switch matrix, the first data to the operation component;

inputting the second data to the operation component by the second port crossbar switch matrix; and processing, by the operation component, the first data and the second data according to the execution parameter in the configuration instruction to obtain a target operation result wherein the operation component comprises at least one of a comparator, an adder, a multiplier or a lookup table, and the processing the first data and the second data comprises at least one of:

performing, by the comparator, a numerical comparison operation on at least one of the first data or the second data;

performing, by the adder, a numerical summation operation on at least one of the first data or the second data;

performing, by the multiplier, a numerical multiplication operation on two pieces of data, the two pieces of data including at least one of the first data or the second data; or performing, by the lookup table, a table lookup operation according to at least one of the first data or the second data, or performing, by the lookup table a linear interpolation operation and a table lookup operation according to at least one of the first data or the second data.

15. The data processing method according to claim 14, wherein the execution parameter carries an operation mode identifier, and the method further comprises:

receiving, by the data input channel, a data write address;

reading, by the first port crossbar switch matrix, the first data from the data input channel corresponding to a first read address;

reading, by the second port crossbar switch matrix, the second data from the data input channel corresponding to a second read address;

processing, by the operation component, data using an operation mode corresponding to the operation mode identifier according to the execution parameter to obtain an intermediate operation result, to process the intermediate operation result to obtain the target operation result, and to input the target operation result into the first port crossbar switch matrix; and outputting, by the first port crossbar switch matrix, the target operation result according to the data write address.

16. The data processing method according to claim 14, further comprising:

receiving, by the data input channel, a control signal and a window identifier, wherein the control signal includes at least one of a feature map end flag or a data valid flag, wherein the feature map end flag represents a last piece of data in a feature map, and the data valid flag represents enabling the ALU, wherein the window identifier includes at least one of a window start identifier and a window end identifier, wherein the window start identifier represents a first piece of data in a window, and the window end identifier represents a last piece of data in a window.

17. The data processing method according to claim 14, wherein the data input channel includes at least a tensor input channel, a scalar input channel, and an address input channel, and the method further comprises:

receiving, by the tensor input channel, at least one of the first data or the second data, wherein the first data and the second data are both data included in a tensor;

receiving, by the scalar input channel, the second data, wherein the second data is data corresponding to a scalar; and receiving, by the address input channel, a result output address, wherein the result output address is an address written into a memory.

18. The data processing method according to claim 14, wherein the second port crossbar switch matrix includes a delay adjuster, and the method further comprises:

inputting, by the first port crossbar switch matrix, the first data to the operation component in a first clock cycle;

outputting, by the operation component, an intermediate operation result to the first port crossbar switch matrix in a second clock cycle, wherein the intermediate operation result is obtained from an operation performed according to the first data, and the second clock cycle and the first clock cycle are spaced by M clock cycles, wherein M is an integer greater than or equal to 1;

inputting, by the first port crossbar switch matrix, the intermediate operation result to the operation component in a third clock cycle, wherein the third clock cycle and the first clock cycle are spaced by N clock cycles, wherein N is an integer greater than or equal to M; and inputting, by the delay adjuster, the second data to the operation component in the third clock cycle.

19. A non-transitory computer-readable storage medium storing computer program instructions executable by a processing component, the processing component including at least one arithmetic and logic unit (ALU), the ALU including a decoding and parameter input channel, a data input channel, an operation component, a first port crossbar switch matrix, and a second port crossbar switch matrix, and the computer program instructions causing the processing component to perform:

receiving, by the decoding and parameter input channel, an execution parameter, the execution parameter being obtained by parsing a configuration instruction;

receiving, by the data input channel, first data and second data;

inputting, by the first port crossbar switch matrix, the first data to the operation component;

inputting, by the second port crossbar switch matrix, the second data to the operation component; and processing, by the operation component, the first data and the second data according to the execution parameter to obtain a target operation result, wherein the operation component comprises at least one of a comparator, an adder, a multiplier or a lookup table, and the processing the first data and the second data comprises at least one of:

performing, by the comparator, a numerical comparison operation on at least one of the first data or the second data;

performing, by the adder, a numerical summation operation on at least one of the first data or the second data;

performing, by the multiplier, a numerical multiplication operation on two pieces of data, the two pieces of data including at least one of the first data or the second data; or performing, by the lookup table, a table lookup operation according to at least one of the first data or the second data, or performing, by the lookup table a linear interpolation operation and a table lookup operation according to at least one of the first data or the second data.

\* \* \* \* \*